United States Patent
Strong

(10) Patent No.: US 12,447,647 B2
(45) Date of Patent: Oct. 21, 2025

(54) GUNITE FEED WHEEL

(71) Applicant: Brooks Strong, Houston, TX (US)

(72) Inventor: Brooks Strong, Houston, TX (US)

( * ) Notice: Subject to any disclaimer, the term of this patent is extended or adjusted under 35 U.S.C. 154(b) by 161 days.

(21) Appl. No.: 18/511,571

(22) Filed: Nov. 16, 2023

(65) Prior Publication Data
US 2024/0158186 A1    May 16, 2024

Related U.S. Application Data

(60) Provisional application No. 63/425,921, filed on Nov. 16, 2022.

(51) Int. Cl.
| | |
|---|---|
| *B28C 7/16* | (2006.01) |
| *B05C 5/02* | (2006.01) |
| *B65G 53/10* | (2006.01) |
| *B65G 53/46* | (2006.01) |
| *B65G 53/50* | (2006.01) |
| *B65G 53/52* | (2006.01) |

(52) U.S. Cl.
CPC .................. *B28C 7/16* (2013.01); *B05C 5/02* (2013.01); *B65G 53/10* (2013.01); *B65G 53/4616* (2013.01); *B65G 53/4658* (2013.01); *B65G 53/50* (2013.01); *B65G 53/52* (2013.01); *B65G 2201/042* (2013.01)

(58) Field of Classification Search
CPC .. B65G 53/4616; B65G 53/4658; B28C 7/16; B28C 7/163; B28C 7/165; B28C 7/166
USPC .................................. 406/62, 63, 64, 68, 155
See application file for complete search history.

(56) References Cited

U.S. PATENT DOCUMENTS

| | | | | |
|---|---|---|---|---|
| 3,161,442 A | * | 12/1964 | Reed .................. | B65G 53/4616 406/135 |
| 3,672,646 A | * | 6/1972 | Burtin ..................... | G01F 11/24 366/13 |
| 4,025,122 A | * | 5/1977 | Diemert ................. | B65D 88/68 406/134 |
| 4,154,486 A | * | 5/1979 | Nishikawa ......... | B65G 53/4616 406/75 |
| 5,645,379 A | * | 7/1997 | Stoner ................ | B65G 53/4641 406/67 |
| 5,915,887 A | * | 6/1999 | Sulman .............. | B65G 53/4641 406/64 |
| 7,094,004 B2 | * | 8/2006 | Dunlop ..................... | B60P 1/00 406/146 |

* cited by examiner

*Primary Examiner* — William R Harp
(74) *Attorney, Agent, or Firm* — Polsinell PC

(57) ABSTRACT

A feed wheel is provided that includes a body, a plurality of material ports formed in the body, and a plurality of outer pressure ports formed in the body. The body is operable to rotate about a central axis. The material ports are operable to receive material. The outer pressure ports are positioned radially outward in relation to the material ports. Each of the outer pressure ports is operable to receive pressurized gas when in registration with a pneumatic supply as the body rotates about the central axis. Each of the outer pressure ports are in fluid communication with a corresponding material port such that when an outer pressure port receives the pressurized gas, the pressurized gas discharges the material from the corresponding material port s out of the top surface of the body.

20 Claims, 23 Drawing Sheets

GUNITE FEED WHEEL

CROSS REFERENCE TO RELATED APPLICATIONS

This application claims the benefit of U.S. Provisional Application No. 63/425,921, filed on Nov. 16, 2022, which is incorporated herein in its entirety.

FIELD

The present disclosure relates generally to a feed wheel for conveying particulate material (such as, but not limited to, gunite) to a delivery apparatus.

BACKGROUND

There are a number of construction applications, particularly the shell construction of swimming pools, which are most commonly accomplished with the application of 'shotcrete', or concrete fired at high velocity from an impulsion mechanism. The 'Gunite', or 'Dry Shotcrete', method keeps the constituent components of concrete separated until the moment of high velocity application, at which point it is critical to the gunite method that said component ingredients be rapidly mixed in appropriate and accurate ratios and fed into a shooting mechanism, typically by way of injecting the mixture into a pressurized flow.

The speed and power of the shotcrete application makes it easier to achieve a more compact, denser, and less porous product which in turn produces a stronger product with better corrosion resistance for reinforcement material. High velocity packing of shotcrete also enables better adherence to irregularly shaped or textured surfaces.

Key to the efficient and expedient execution of a gunite operation are the experienced crews, in particular the "nozzle-men", who with sufficient expertise can rapidly deploy gunite materials in complex geometries. Expert, rapid deployment of gunite materials can substantially reduce the amount of time needed to complete a task to the benefit of all parties involved or invested in the expedient completion of the operation.

BRIEF DESCRIPTION OF THE DRAWINGS

Implementations of the present technology will now be described, by way of example only, with reference to the attached figures, wherein.

DETAILED DESCRIPTION

Figure 1:
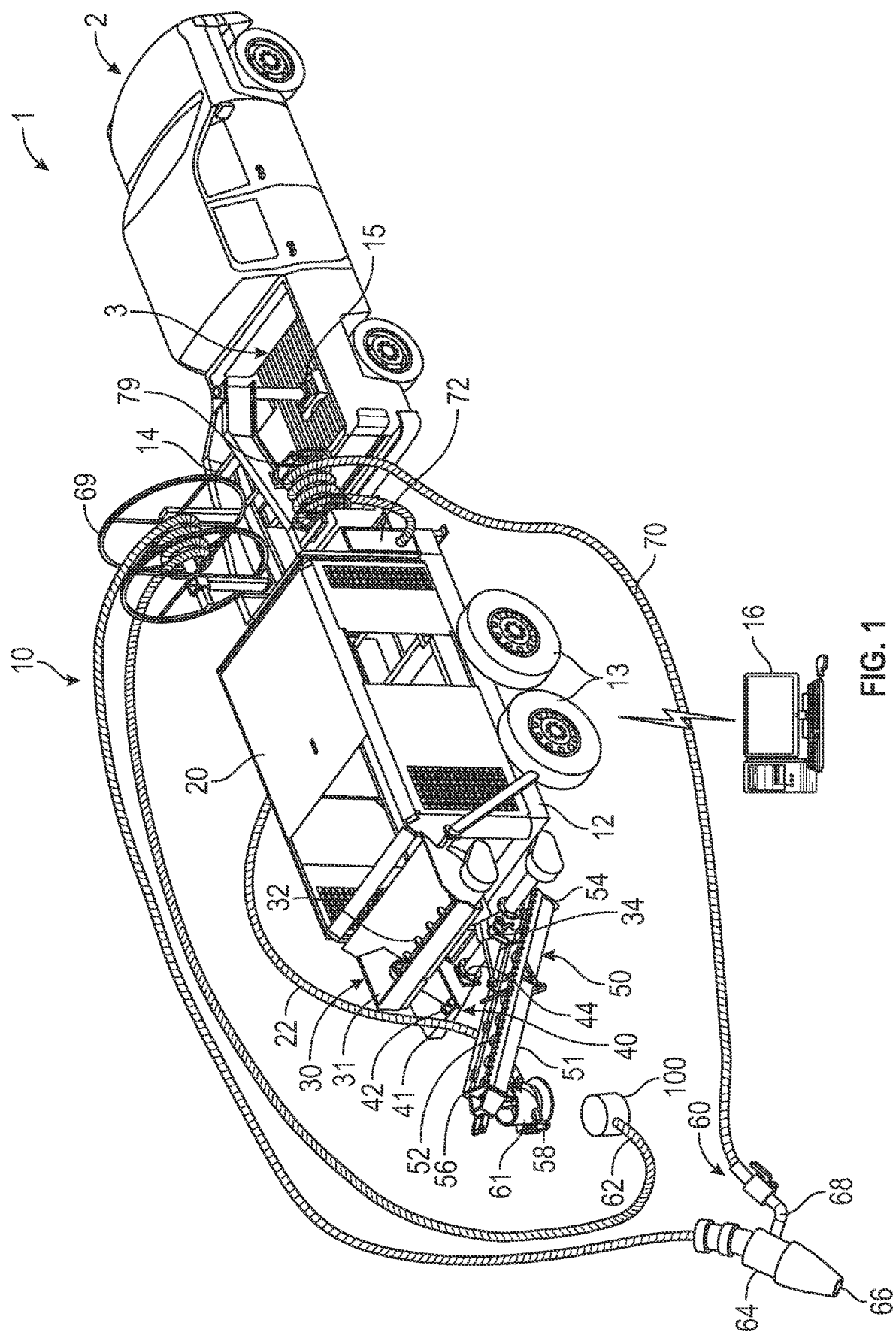
FIG. 1 illustrates an example system with a gunite trailer and a feed system.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

Several definitions that apply throughout this disclosure will now be presented. The term "coupled" is defined as connected, whether directly or indirectly through intervening components, and is not necessarily limited to physical connections. The term "substantially" is defined to be essentially conforming to the particular dimension, shape or other word that substantially modifies, such that the component need not be exact. For example, substantially cylindrical means that the object resembles a cylinder, but can have one or more deviations from a true cylinder. The term "about" means reasonably close to the particular value. For example, about does not require the exact measurement specified and can be reasonably close. As used herein, the word "about" can include the exact number. The term "near" as used herein is within a short distance from the particular mentioned object. The term "near" can include abutting as well as relatively small distance beyond abutting. The terms "comprising," "including" and "having" are used interchangeably in this disclosure. The terms "comprising," "including" and "having" mean to include, but not necessarily be limited to the things so described.

Conventional apparatuses for the mixing and dispensation of gunite materials are limited in the speed that a volume of gunite materials can be deployed. Past a certain point, injecting faster flowing compressed air or increasing the rotary speed of rotary mixers does not sufficiently increase the dispensed volume, and, in many experimentally discovered cases, may reduce the speed that a volume of material is dispensed to the shooting mechanism.

Rotary feed wheels are fed material, typically by gravitational means from an above-placed hopper, into chambers arranged generally circularly about a rotary axis. As the rotary feed wheel rotates, opening ports of said chambers move into registration with dispensation ports that allow the rotary feed wheel to receive the aforementioned material in the aforementioned way. As rotation continues, said ports move out of registration with inlet dispensers and into registration with an expulsion apparatus which blows a pneumatic fluid, usually compressed air, into one end of the filled material chamber. This injects the chamber-held materials into a pressurized feed line that is later dispensed at the job site in an appropriate way.

Without sufficient improvement of gunite mixing apparatuses, the benefit in job completion speed gained by the experience of a crew is limited by the volumetric output speed of the mechanisms employed.

In many cases, mixing devices use direct application of force on the mixing bowl to insulate active mixing chambers from inactive mixing chambers. This method, while generally effective, places a high level of rapidly changing and uneven stress on the feed wheel and significantly wears down the insulation used to make this seal resulting in significant and irregular wear on the mechanical and sealing components of the impulsion and mixing mechanism.

Conventional systems result in rapidly worn out devices and seals in need of constant replacement; costing valuable maintenance time, effort, parts, and may result in costly replacements for mixers, possibly at inopportune times, which may result in lost jobs, job inefficiencies, or potential safety hazards.

Additionally, the intense irregular wear expected to be experienced by the components of the conventional device limits what the device can be made of. Many lightweight, inexpensive, or easy to manufacture component materials, whose use could aggregate to substantial savings on the part of the manufacturer, cannot be used because of their inability to survive such high heat and abrasive wear.

The present disclosure includes several features to accommodate a feed system that can withstand the high heat and abrasive wear.

In at least one example, the feed system can include a feed wheel that has outer pressure ports in fluid communication with corresponding material ports. The outer pressure ports are positioned concentrically outside of the material ports such that the outer pressure ports are positioned proximate the perimeter in relation to the material ports. Positioning the outer pressure ports such that the material ports are positioned between the outer pressure ports and the rotation axis of the feed wheel provides greater exertion force of the material from the material ports. Accordingly, the feed wheel does not need a larger diameter to expel more material through the delivery apparatus.

In at least one example, the feed system includes a wear pad that is operable to cool down the feed system. For example, the wear pad can be operable to receive a fluid (e.g., water) to lower the temperature of the feed wheel and wear pad as the feed wheel rubs against the wear pad.

In at least one example, one or more hold downs can be operable to enact a force onto the wear pad. The hold downs can be operable to push against the wear pad such that the wear pad maintains regular contact with the feed wheel. This can limit the amount and speed of wear on the feed wheel and/or the wear pad.

With the different components, the feed system can withstand the high heat and abrasive wear while efficiently and effectively delivering material to the delivery apparatus.

The disclosure now turns to FIG. 1, which illustrates an example of a gunite system 1 that includes a feed system 100 operable to deliver gunite.

Conventionally, a "Gunite crew" and/or a "dry Gunite crew" (hereinafter "crew") requires a plurality of heavy-duty trucks, for example multiple class 6, 7, and/or 8 trucks, outfit with volumetric mixers, which deliver dry concrete sand and cement, for example type 1 Portland cement, to a jobsite. These mixers utilize hydraulic driven augers to transfer and blend these materials. The "crew" also requires an air compressor, typically outrigged on another separate heavy-duty truck, equipped with a Gunite hose reel and a water hose reel. These plurality of trucks supply the referenced materials and air to a Gunite delivery gun apparatus, yet another separate piece of equipment required for pool building.

FIG. 1 illustrates a gunite system 1 to be utilized for composing and delivering gunite material (e.g., sand and cement) to a jobsite. As shown in FIG. 1, the gunite system 1 can include a gunite trailer 10. The gunite trailer 10 is a self-contained system for mixing, proportioning, and conveying the gunite material. The gunite trailer 10 can include a frame 12 operable to be coupled to a vehicle 2. The frame 12 can include at least two wheels 13 such that the frame 12 can be pulled along by a vehicle 2. In at least one example, the gunite trailer 10 can include a gooseneck 14 coupled with the frame 12 and operable to couple with the vehicle 2. In some examples, the gooseneck 14 can include a foot 15 that is operable to be received by and coupled with the vehicle 2. For example, as illustrated in FIG. 1, the foot 15 can be received in a bed 3 of the vehicle 2 (e.g., a truck). In at least one example, the vehicle 2 is a truck that can transport the gunite trailer 10. For example, the truck can be a medium-duty pick-up truck. Accordingly, the vehicle 2 does not require a commercial driver's license (CDL), and the gunite trailer 10 can be transported and utilized without the need of special equipment or licenses.

While the figures herein focus on a gunite trailer 10 with a gooseneck 14, in some examples, the gunite trailer 10 may not include a gooseneck 14. In some examples, the gunite trailer 10 can include trailer configurations, for example a step deck trailer, a lowboy trailer, a double drop trailer, a Conestoga trailer, and/or a flatbed trailer. In some examples, the gunite trailer 10 can include a hitch connection. In some examples, the gunite trailer 10 can include trailer connections, for example, receiver hitch, bumper hitch, weight distribution hitch, pintle hitch, and/or 5th wheel hitch. The gunite trailer 10 can be transported with a medium-duty pick-up truck which does not require a CDL. Accordingly, a crew does not have to rent or buy so many trucks and obtain so many licenses. This allows for easier transport and easier management.

As illustrated in FIG. 1, the frame 12 can be operable to receive and/or contain components for mixing, proportioning, and conveying the gunite material. For example, the gunite trailer 10 can include a compressor 20 disposed on the frame 12, a sand bin 30 coupled to the frame 12 and operable to deliver sand, a cement bin 40 coupled to the frame 12 and operable to deliver cement, a mixing bin 50 coupled to the frame and operable to receive the sand from the sand bin 30 and the cement from the cement bin 40, and a delivery connection 61 operable to receive the sand and the cement from the mixing bin 50 and be coupled with a delivery system 60 operable to convey the gunite material to a surface.

The compressor 20 can be operable to provide air to the delivery system 60. The air from the compressor 20 can push the mixed sand and cement through a conduit (e.g., gunite hose 62) for the delivery system 60 and out of the nozzle 64 to the application location. As illustrated in FIG. 1, the compressor 20 can be coupled to the delivery system 60 via the delivery connection 61. In some examples, the compressor 20 can be coupled with a feed system 100 to deliver the gunite material received in the feed system 100 from the delivery connection 61. The feed system 100 can be coupled with the delivery system 60 to then dispense the gunite material to the surface. In at least one example, a compressor conduit 122 can fluidly connect the compressor 20 with the delivery connection 61. The air can be transported from the compressor 20 through the compressor conduit 122 to the delivery connection 61. At the delivery connection 61, the air can push the cement and the sand from the mixing bin 50 through the gunite hose 62 and out of the outlet 166 of the nozzle 64. Accordingly, the compressor 20 is coupled with the delivery connection 61 so that the sand and the cement received in the delivery connection 61 are pneumatically conveyed from the delivery connection 61 through the gunite hose 62 and out of the nozzle 64.

The sand bin 30 can include a sand receptacle 31 operable to receive and store the sand. The sand bin 30 can include a sand auger 42 operable to transfer the sand within the sand receptacle 31 towards the mixing bin 50. The sand auger 42 can be operable to move the sand towards an outlet 44 (e.g., a hole and/or a chute) which leads to the mixing bin 50 to mix with the cement. In at least one example, the sand auger 42 can be disposed horizontally. In some examples, the sand auger 42 can be disposed vertically. In some examples, more than one sand auger 42 can be utilized.

The cement bin 40 can include a cement receptacle 41 operable to receive and store the cement. The cement bin 40 can include a cement auger 42 operable to transfer the cement within the cement receptacle 41 towards the mixing bin 50. The cement auger 42 can be operable to move the cement towards an outlet 44 (e.g., a hole and/or chute) which leads to the mixing bin 50 to mix with the sand. In at least one example, the cement auger 42 can be disposed horizontally. In some examples, the cement auger 42 can be disposed vertically. In some examples, more than one cement auger 42 can be utilized.

In at least one example, as illustrated in FIG. 1, the cement bin 40 can be located lower than the sand bin 30. In such a configuration, the cement bin 40 is located lower so that the cement can be loaded in the cement receptacle 41 easier via cement bags. In some examples, a Super Sack attachment can be coupled to the cement bin 40 so that a larger sack of cement can be loaded into the cement bin 40 at a time.

In at least one example, as illustrated in FIG. 1, the cement bin 40 can be located on the driver side of the gunite trailer 10. In other words, the cement bin 40 can be located on the gunite trailer 10 proximate a side that corresponds with the driver side of the vehicle 2. Accordingly, the cement bin 40 can be accessible via the driver side of the frame 12. This may be desired as the driver side of the vehicle 2 and subsequently the frame 12 and gunite trailer 10 can be proximate the street. As such, the cement can be loaded into the cement receptacle 41 from the street instead of on the curb or on the property. With such a configuration, the cement can be loaded with ease by hand or with any desired equipment, and the crew would have room to maneuver to access the cement receptacle 41.

In some examples, the cement bin 40 can be located on the passenger side of the frame 12 in circumstances where the passenger side of the vehicle 2 and correspondingly the frame 12 would be proximate the street.

In at least one example, the conveying of the cement from the cement bin 40 and the sand from the sand bin 30 can be individually controlled to deliver the cement and the sand within a predetermined ratio. Accordingly, the gunite material being delivered has the desired ratio and produces the desired results.

In at least one example, the sand bin 30 can include a sand valve 36. The sand valve 36 can be opened and/or closed to control the amount and rate of sand that is moved from the sand receptacle 31 to the mixing bin 50. In at least one example, the sand valve 36 can be communicatively coupled with a controller 16 to control the amount and rate of sand that is moved to the mixing bin 50. In at least one example, the sand auger 31 can be communicatively coupled with the controller 16 to control the amount and rate of sand that is moved within the sand receptacle 42 towards the mixing bin 50. Accordingly, the proportion of sand to cement can be managed.

In at least one example, the cement bin 40 can include a cement valve 146. The cement valve 146 can be opened and/or closed to control the amount and rate of cement that is moved from the cement receptacle 41 to the mixing bin 50. In at least one example, the cement valve 146 can be communicatively coupled with a controller 16 to control the amount and rate of cement that is moved to the mixing bin 50. In at least one example, the cement auger 41 can be communicatively coupled with the controller 16 to control the amount and rate of cement that is moved within the cement receptacle 42 towards the mixing bin 50. Accordingly, the proportion of sand to cement can be managed.

The cement and the sand are moved from the cement bin 40 and the sand bin 30 to the mixing bin 50. The mixing bin 50 can include a mixing receptacle 51 operable to receive and store the cement and the sand. The mixing bin 50 can include a mixing auger 52 operable to mix and transfer the cement and the sand through the mixing bin 50 to the delivery connection 61. The mixing receptable 51 can include a receiving portion 54 where the outlets 34, 44 deposit the cement and sand into the mixing receptacle 51. The mixing auger 52 can then mix and transfer the cement and the sand from the receiving portion 54 towards the outlet portion 56. At the outlet portion 56, the mixed cement and sand can move from the mixing receptacle 51 out of an outlet 58 to the delivery connection 61.

In at least one example, the mixing bin 50 can be raised and lowered to move material from the sand bin 30 and the cement bin 40 to the delivery system 60. When the mixing bin 50 is raised, the outlet portion 56 of the mixing bin 50 is raised away from the ground, and the cement and sand in the mixing receptacle 51 is prevented from exiting the outlet 58. When the mixing bin 50 is lowered, the outlet portion 56 of the mixing bin 50 is lowered towards the ground, and the cement and sand in the mixing receptacle 51 can flow towards the outlet 58. In some examples, when the mixing bin 50 is lowered, the outlet portion 56 is lowered for easy connection to the delivery system 60.

The delivery connection 61 is operable to receive the mixed cement and sand from the mixing bin 50 and transition the mixed cement and sand to the delivery system 60. In at least one example, the delivery connection 61 can be in fluid connection with the mixing bin 50. In at least one example, the delivery system 60 is in fluid connection with the mixing bin 50. For example, the delivery system 60 can be coupled with the feed system 100, which is operable to receive the gunite material (e.g., from the delivery connection 61). The feed system 100 then delivers the gunite material to the delivery system 60 to convey the gunite material to the surface (as shown in FIG. 2).

Figure 2:
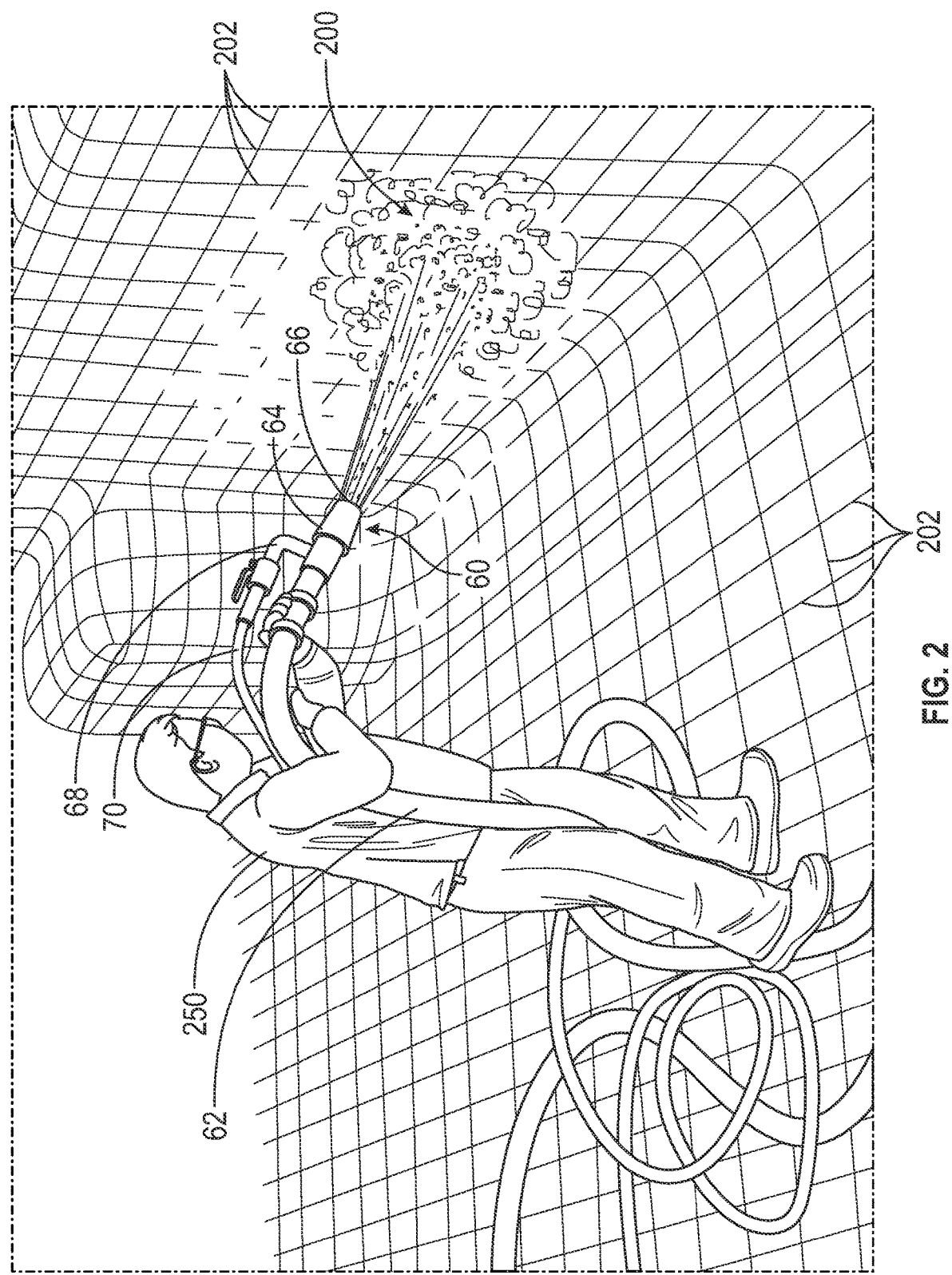
FIG. 2 illustrates a delivery apparatus delivering particulate material.

Referring also to FIG. 2, the delivery system 60 is operable to convey the gunite material to the surface 200 for application. In at least one example, as illustrated in FIG. 2, the surface 200 can have a frame 202 (e.g., wire frame) formed thereon to assist in maintaining the structural integrity of the gunite. Referring to FIGS. 1-2, the delivery system 60 can include a gunite hose 62 and a nozzle 64. The gunite hose 62 can be operable to be coupled with the feed system 100 and the nozzle 64. The gunite hose 62 receives the mixed cement and sand from the feed system 100 and transports the mixed cement and sand to the nozzle 64. The mixed cement and sand can be conveyed through the gunite hose 62 by pneumatic air delivered from the compressor 20 via the compressor conduit 122 to the feed system 100 (as discussed in further detail below).

In at least one example, the gunite trailer 10 can include a gunite hose reel 69 operable to store and convey the gunite hose 62. The gunite hose 62 can be wound around the gunite hose reel 69 and conveyed as needed to the application surface. In at least one example, the gunite hose 62 can be detachably coupled with the feed system 100. When detached, the gunite hose 62 can be wound around the gunite hose reel 69 for storage. In some examples, the gunite hose 62 can be attached to the feed system 100 at the jobsite.

In at least one example, the delivery system 60 can include a fluid hose 70 operable to be coupled with the nozzle 64. For example, as illustrated in FIG. 1, the fluid hose 70 can be fluidly coupled with the nozzle 64 via a fluid port 168. The fluid hose 70 can be fluidly coupled with a fluid source 72 so that the fluid hose 70 is operable to deliver the fluid from the fluid source 72 to the point of application. At the point of application, the fluid mixes with the mixed cement and sand to form gunite, and the gunite is conveyed out of the nozzle 64 via the outlet 166 of the nozzle 64. The point of application to form gunite is at the nozzle 64. The fluid is not supplied to the sand and cement mixture until the mixture reaches the nozzle 64. Fluid (e.g., water) is added as the mixture is shot directly on the point of application. The resultant concrete has a high cement-to-water ratio and high compaction, making it stronger than most other forms of concrete. Additionally, as the gunite is formed at the point of application instead of pre-mixed, the crew is not working against a clock of a pre-mixed composition setting.

In at least one example, the gunite trailer 10 can include a fluid hose reel 79 operable to store and convey the fluid hose 70. The fluid hose 70 can be wound around the fluid hose reel 79 and conveyed as needed to the application surface. In at least one example, the fluid hose 70 can be detachably coupled with the nozzle 64. When detached, the fluid hose 70 can be wound around the fluid hose reel 79 for storage. In some examples, the fluid hose 70 can be attached to the nozzle 64 at the jobsite.

In at least one example, the fluid includes water. In at least one example, as illustrated in FIG. 1, the fluid source 72 can be disposed on the frame 12. In some examples, the fluid source 72 can be a water sump such as a tank of water separate from the gunite trailer 10. In some examples, the fluid source 72 can be a garden hose spigot from the property.

Conventionally, the delivery system is a separate piece of equipment, where mixing trucks deposit sand and cement into a feed wheel. Accordingly, conventional mixing trucks can move and be replaced while the feed system 100 and delivery system 60 stay in one place. The delivery system 60 is operable to eject the sand and cement mixture out of a nozzle 64 along with the fluid. The sand and cement mixture moves from the mixing bin 50 into the feed system 100 and then into the gunite hose 62 from the gunite hose reel 69. Air from the compressor 20 pushes the sand and cement mixture from the feed system 100, through the gunite hose 62, and out of the nozzle 64.

The gunite trailer 10 provides a single piece of equipment that combines the conventional need of multiple trucks and pieces of equipment. The gunite trailer 10 is configured to permit ease of use and increased safety for loading, mixing, and conveying gunite to the application surface. Additionally, the gunite trailer can be towed with a commercial driver's license. Accordingly, gunite and/or pool companies with less capital or with smaller projects can complete projects without the need to invest in licenses, multiple trucks, and/or multiple pieces of equipment.

Figure 3A:
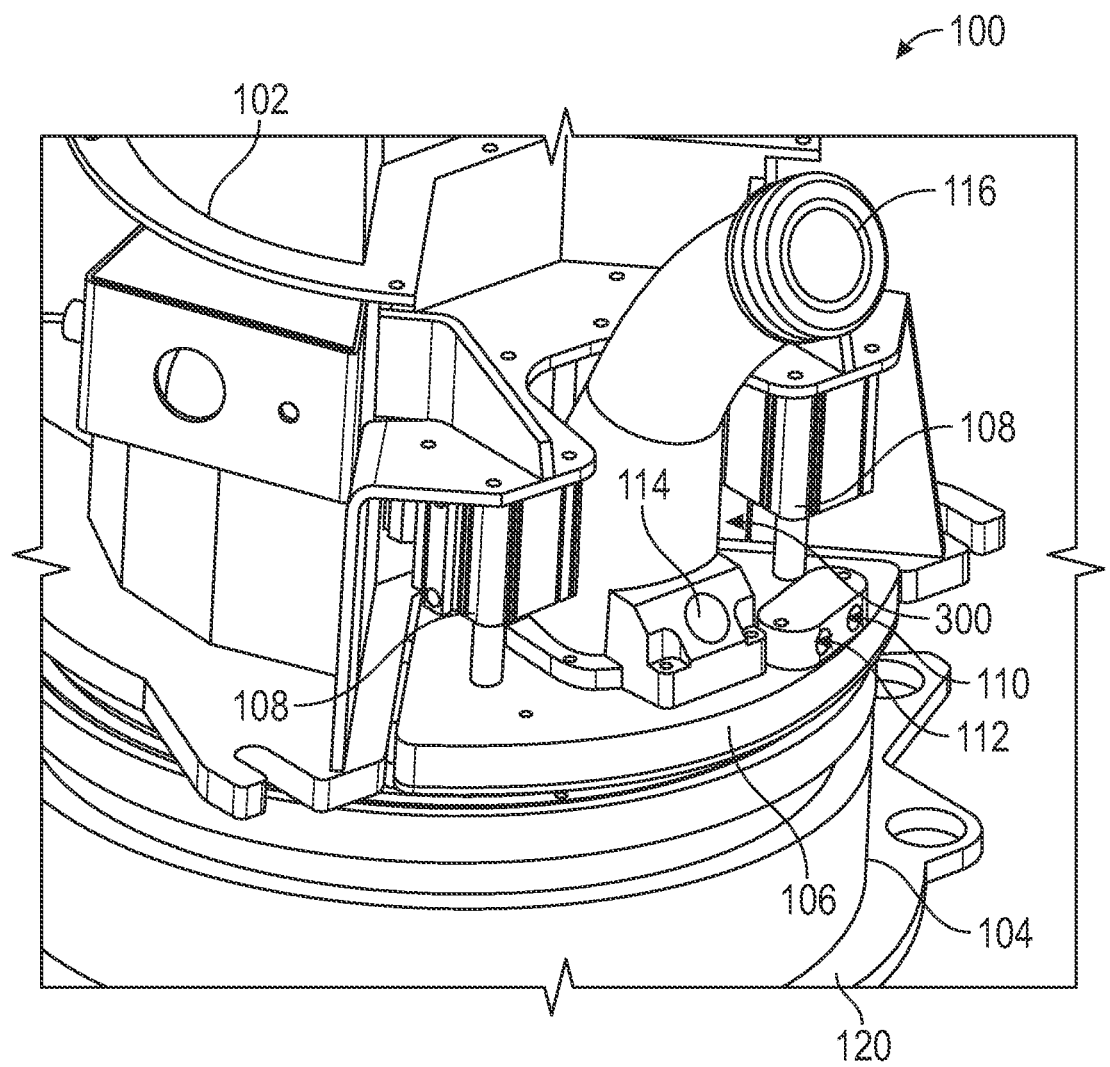
FIG. 3A illustrates the feed system.
Figure 3B:
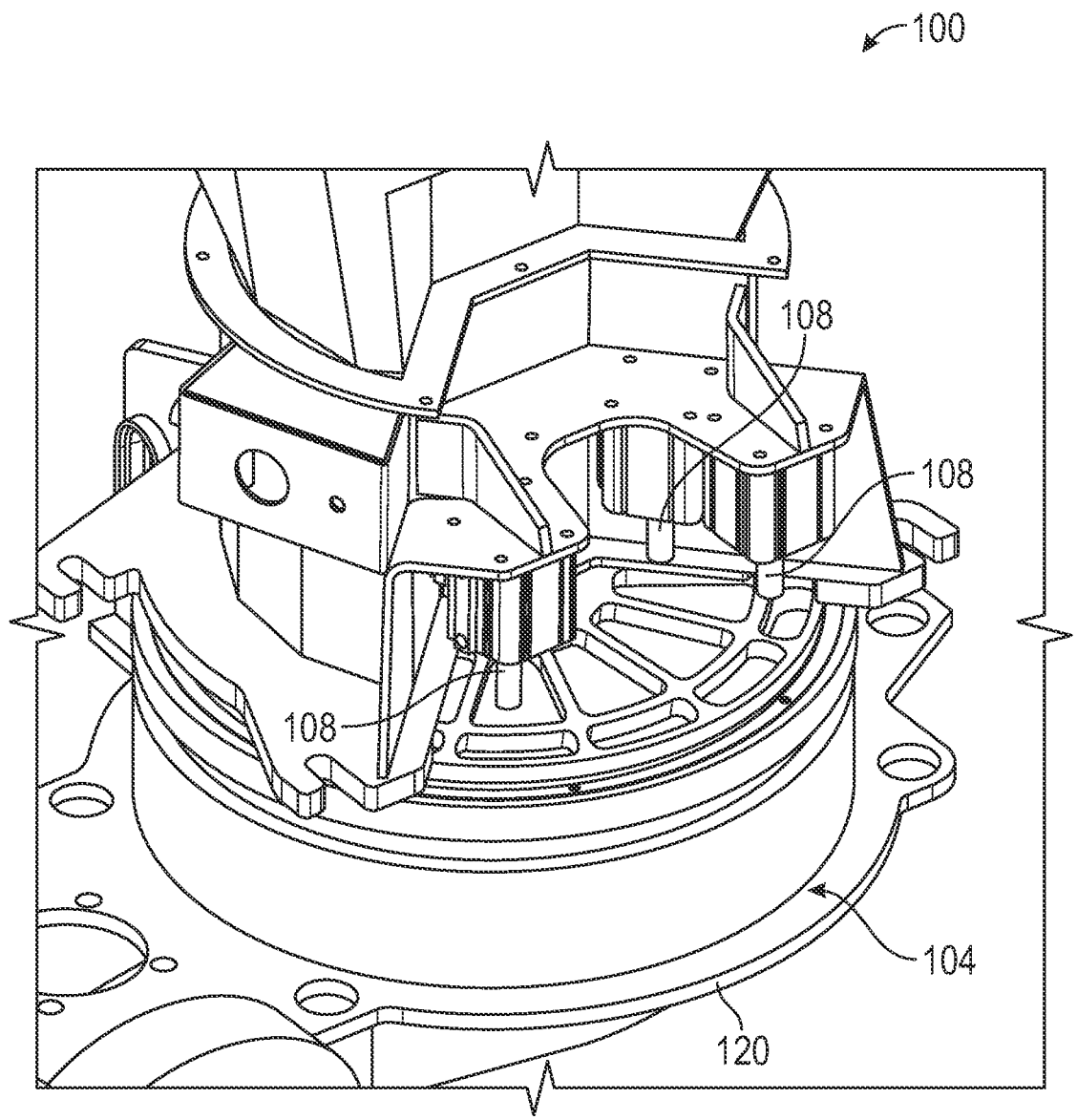
FIG. 3B illustrates the feed system, omitting a wear pad.
Figure 3C:
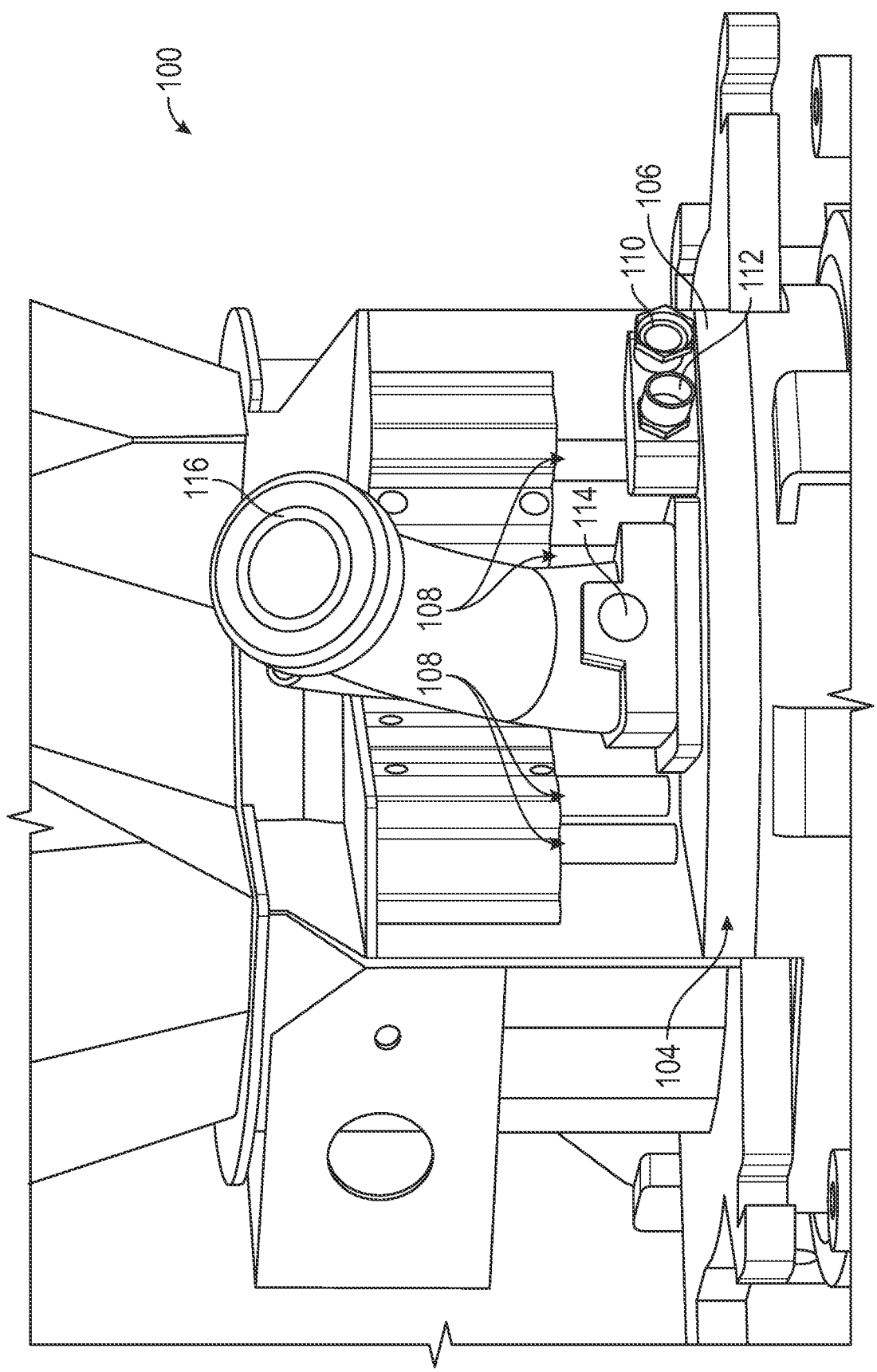
FIG. 3C illustrates the feed system.

Referring to FIGS. 3A-3C, the feed system 100 is operable to receive the gunite material (e.g., from the delivery connection 61) and deliver the gunite material to the delivery system 60 for dispensing onto the surface 200. The feed system 100 can be operable to dispense gunite material efficiently and effectively to the delivery system 60 while improving durability and decreasing wear and tear on the feed system 100. In some examples, the feed system 100 can be utilized with the gunite trailer 10 as discussed above. In some examples, the feed system 100 can be utilized with a conventional gunite delivery system.

The feed system 100 can include a feed wheel 104 that is operable to receive gunite material. For example, in at least one example, as illustrated in FIG. 3A, the feed wheel 104 can receive the gunite material from a feeding hopper 102. In some examples, the feed wheel 104 can receive the gunite material from the delivery connection 61.

A wear pad 106 can be operable to provide a seal over at least a portion of the feed wheel 104. The wear pad 106 can be in fluid communication with a pneumatic supply 114 that is operable to provide pneumatic gas to the feed wheel 104 to discharge the material (e.g., gunite material) from the feed wheel 104. The pneumatic supply 114 can be coupled with the compressor 20 to provide the compressed gas (or pneumatic gas) to the feed wheel 106. The pneumatic supply 114 can include a port that is operable to couple with the gunite hose 62 (for example, as illustrated in FIG. 1).

In at least one example, the wear pad 106 can be operable to couple with a delivery gun assembly 300. The delivery gun assembly 300 can include the pneumatic supply 114 and a discharge conduit 116. The discharge conduit 116 can be operable to be in communication with the feed wheel such that the discharge conduit 116 receives the discharged material from the feed wheel such that the material can be dispensed onto the surface 200. In at least one example, the discharge conduit 116 can be fluidly coupled with the delivery system 60, such as the gunite hose 62. Accordingly, the discharged material flows out of the feed wheel 104 due to the pneumatic gas from the pneumatic supply 114, into the discharge conduit 116, and is dispensed through the delivery system 60 onto the surface 200.

One or more hold downs 108 can be operable to apply pressure against the wear pad 106 such that the hold downs 108 provide consistent, equal pressure to the wear pad 106 against the feed wheel 104. The hold downs 108 are operable to maintain a position of the wear pad 106 against the feed wheel 104. In some examples, to provide consistent pressure across the wear pad 106, the holds downs 108 can be equidistantly spaced about the wear pad 106. In some examples, as shown in FIGS. 3A-3C, the feed system 100 can include four hold downs 108. For example, a hold down 108 may be positioned near each outside corner of the wear pad 106. In some examples, one, two, three, or more than four hold downs 108 can be utilized without deviating from the scope of the disclosure.

The hold downs 108 applying the desired consistent and equal pressure to the wear pad 106 prevents uneven wear on the wear pad 106 as the feed wheel 104 rotates and the wear pad 106 remains stationary. By preventing or reducing uneven wear on the wear pad 106, the wear pad 106 can provide the seal over the feed wheel 104 for a longer period of time. Uneven wear would break the seal prematurely and render the wear pad 106 and/or the feed wheel 104 ineffective and inoperable. The appropriate downward pressure on the wear pad 106 by the hold downs 108 can provide effective and distributed sealing against the rotating feed wheel 104. Additionally, the appropriate downward pressure on the wear pad 106 reduces excessive friction.

In at least one example, the hold downs 108 can include a hydraulic hold down that is used to secure and hold the wear pad 106 firmly in place. In at least one example, the hydraulic hold downs 108 can include hydraulic fluid to create a strong, consistent clamping force onto the wear pad 106 against the feed wheel 104. In at least one example, the hydraulic cylinders can include a piston. The hydraulic fluid can be forced into the hydraulic cylinder. The hydraulic pressure forces the piston to move within the cylinder. As the piston moves, the pressure is applied to the wear pad 106 against the feed wheel 104.

In some examples, the hold downs 108 can include a pneumatic hold down. In at least one example, the pneumatic cylinders are actuated by pressurized fluid (e.g., pressurized air). Air may be supplied from the compressor 20 and controlled through a valve with a regulator, which results in the appropriate downward pressure on the wear pad 106 by the hold downs 108 that is proportional to the gun pressure. In other words, as gun pressure increases, the pressure applied to the wear pad 106 increases. In at least one example, as gun pressure decreases, the pressure applied to the wear pad 106 may be decreased.

Conventional gunite assemblies utilize bolts, such as push bolts, to apply downward pressure on the wear pad 106 to increase the sealing ability between active and inactive mixing chambers on the rotating surface of the feed wheel 104. However, such bolts do not compensate for pad wear and, as a result, the operator must adjust the bolts. This manual process relies on skilled judgment of the operator and requires constant adjustment as the wear pad 106 wears over time. Accordingly, without a torque wrench checking the conventional hold downs periodically, an operator may not know if the force on the wear pad 106 was receiving a constant force or if changes were occurring to the force on the wear pad 106. With hydraulic and/or pneumatic hold downs 108, changes and adjustments to the pressure or force on the wear pad 106 can occur in real-time so that the pressure remains consistent and equal.

The hold downs 108 can provide consistent, equal pressure to the wear pad to allow for maximum material expulsion and longer pad life (prevent material from accumulating between surfaces causing abrasion). In at least one example, as the wear pad 106 is worn down and/or moved over time, the hold downs 108 can automatically adjust the pressure in one or more of the hold downs 108 to ensure appropriate pressure is applied to the wear pad 106.

As illustrated in FIGS. 3A-4D, the feed wheel 104 can be received on a base 120. In some examples, the base 120 can include wheels such that the base 120 can be transported easily to the desired location (e.g., underneath the delivery connection 61 and/or the feeding hopper 102).

Figure 4A:
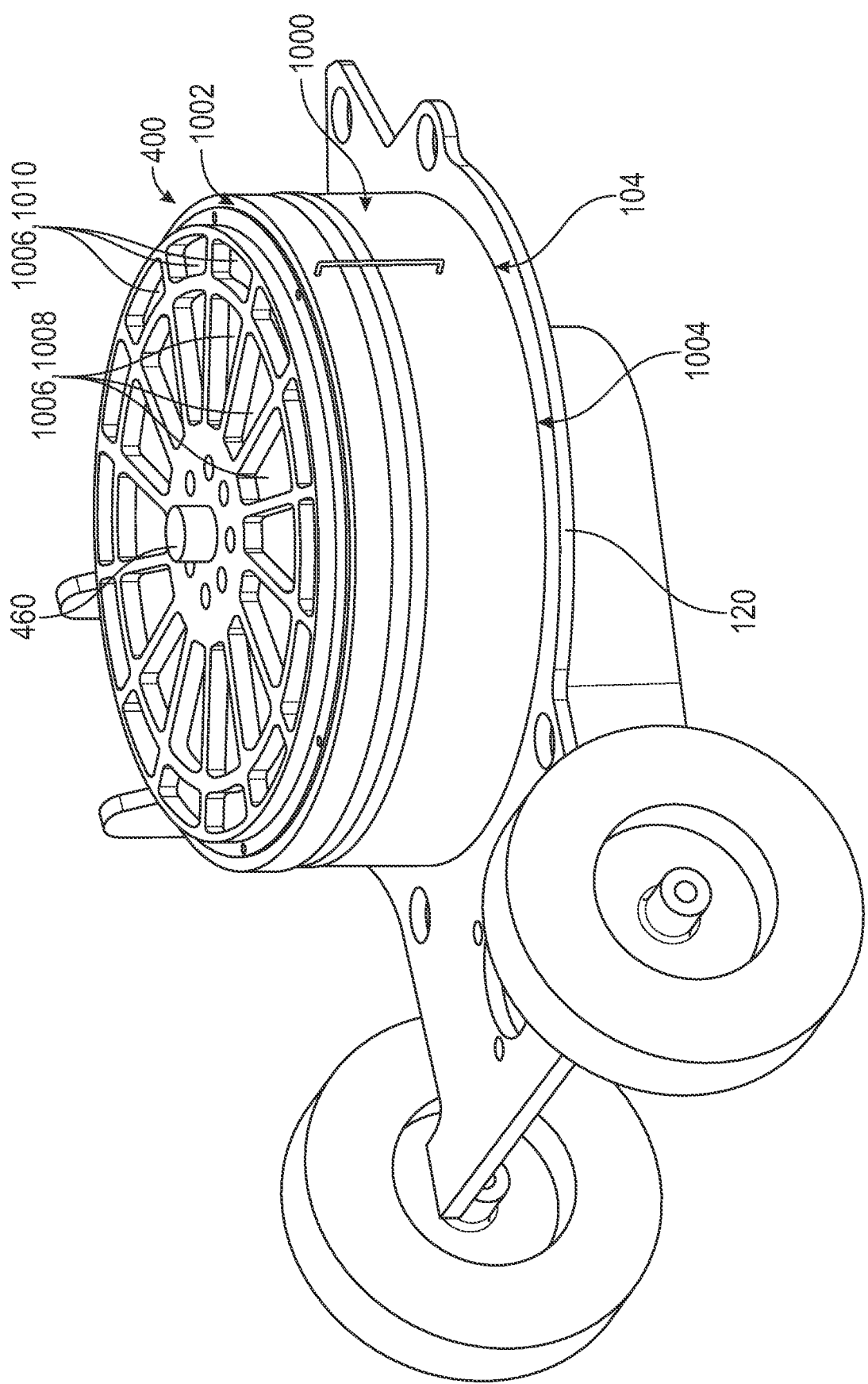
FIG. 4A illustrates a feed wheel on a base.
Figure 4B:
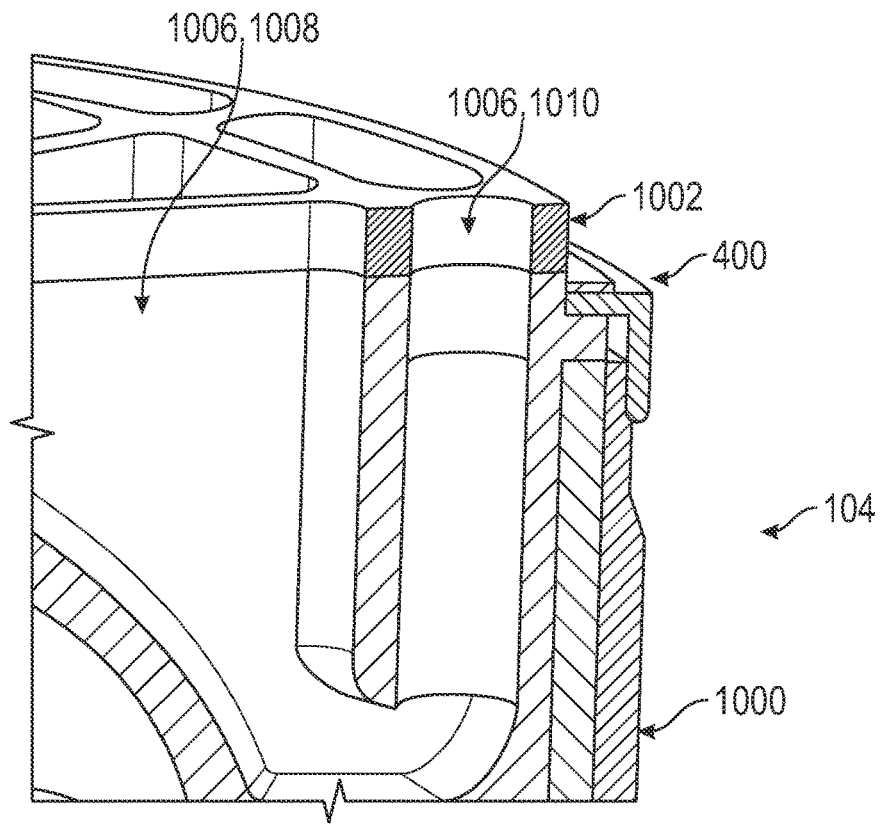
FIG. 4B illustrates a peripheral seal of the feed wheel.

As illustrated in FIG. 4B, a peripheral seal 400 can be situated at the top surface 1002 of the feed wheel 104. The peripheral seal 400 can be oriented to seal the interface between the feed wheel 104 and the feed system 100 (e.g., the wear pad 106, the feeding hopper 102, etc.). In some examples, the peripheral seal 400 can limit, or otherwise prevent, material from collecting (e.g., building-up) on the outside of the feed wheel 104. This, in turn, improves the service life (i.e., longevity) of the feed wheel 104, as material collecting on the outside of the feed wheel 104 can slow or cease rotation of the feed wheel 104 over time. In some examples, the peripheral seal 400 can limit, or otherwise prevent, material from entering a rotary component 450. This, in turn, improves the service life of the rotary component 450, as material entering the rotary component 450 can damage the rotary component 450 (e.g., a thrust bearing). In one example, the peripheral seal 400 can include a lip seal.

Referring to FIGS. 4C-5B, the base 120 can include the rotary component 450 operable to receive the feed wheel 104 while the feed wheel rotates about a central axis (e.g., shaft 460).

Conventional gunite assemblies apply downward pressure in the 'expunging zone' of the rotary feed mechanism to form a reliable air-seal. However, this application of pressure to one area of a rapidly rotating feed wheel produces an uneven stress on the feed system, which can rapidly wear out the feed system and degrade the moving components of the feed system.

The present rotary component 450 of the feed system 100 can include at least one bearing and/or a sliding pad underneath the rotary feed wheel 104. For example, the bearing and/or sliding pad can be between the rotary feed wheel 104 and a base 120. In some examples, the bearing can include a rotary bearing. For example, the rotary bearing can include a thrust bearing (e.g., a thrust ball bearing, a cylindrical thrust roller bearing, a tapered roller thrust bearing, a spherical roller thrust bearing, a needle roller thrust bearing, a fluid bearing, and/or a magnetic bearing).

Figure 5A:
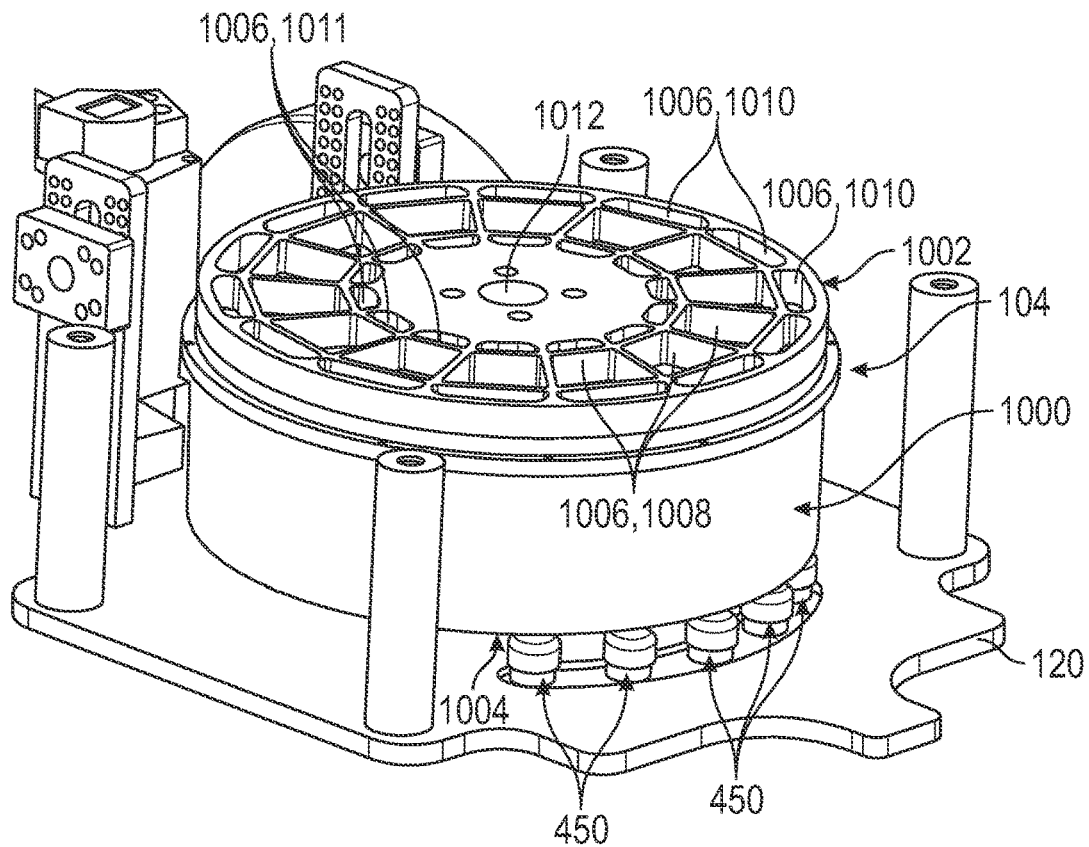
FIG. 5A illustrates the feed wheel on the base.
Figure 5B:
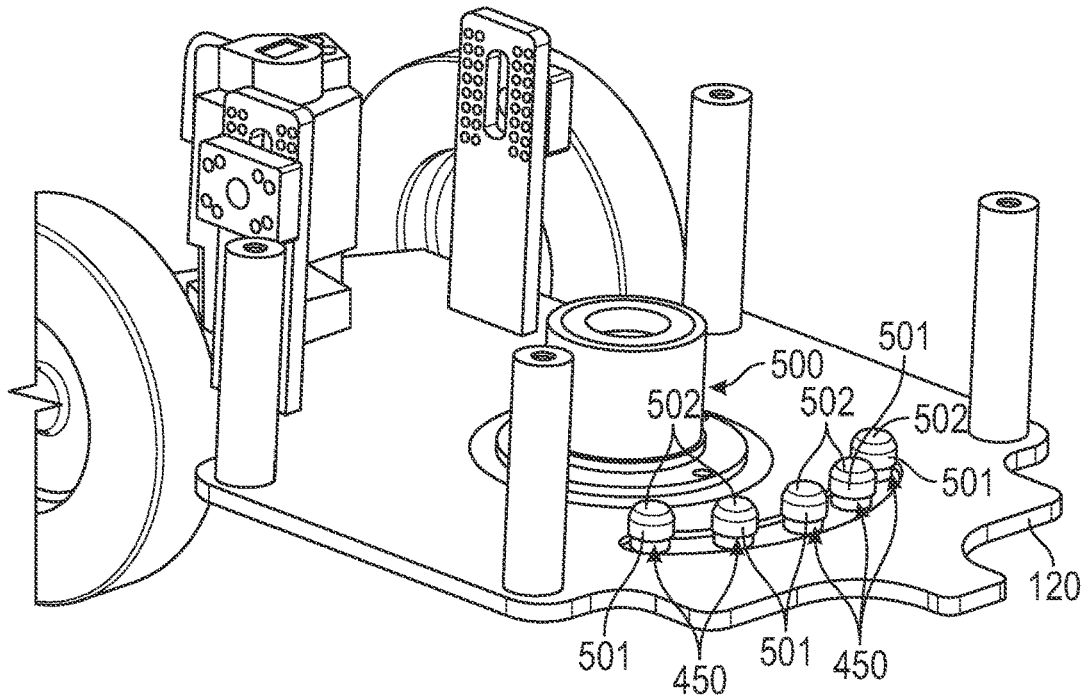
FIG. 5B illustrates the base.

In some examples as illustrated in FIGS. 5A and 5B, the bearing of the rotary component 450 can include more than one ball transfers. For example, the more than one ball transfers can be oriented in substantially a ring (e.g., circular) shape. Each ball transfer can include a housing 501, which defines a ball cup, and a load ball 502 received in the housing 501. The ball cup can include the load ball 502. The housing 501 can be coupled with the bottom surface 1004 of the feed wheel 104 with the ball cup facing downward towards the base 120 and/or the housing 501 can be coupled to the top surface of the base 120 with the ball cup facing upward toward the feed wheel 104.

At least a portion of the rotary component 450 can be made out of, for example, metal, ceramic, plastic, or a combination thereof. The bearing may reduce the stresses of operation. For example, the bearing transfers stress away from the feed wheel 104 and pivot joints of the feed system 100, diverting significant downward force exerted upon the feed wheel 104. This also reduces kinematic friction acting on the feed wheel 104, which substantially decreases the wear and frictional forces exerted on the feed wheel 104. This, in turn, improves the service life (i.e., longevity) of the feed wheel 104 and reduces friction-borne high temperatures from prematurely impacting the particulate mixture within the feed wheel 104.

The rotary component 450 may prevent displacement and deformation of the feed wheel 104 as a result of the force applied to the wear pad 106. The wear pad 106 is above the feed wheel 104 such that the feed wheel 104 is positioned between the rotary component 120 and the wear pad 106. As a result, the rotary component 450 can provide a constant distribution of sealing pressure between the feed wheel 104 and the wear pad 106.

The rotary component 450 can be operable to prevent side loading on the feed wheel 104, thereby placing the feed wheel 104 under a purely compressive load. In at least one example, the rotary component 450 may be located at the furthest point from the central axis of the feed wheel 104 and/or directly below the applied force from the wear pad 106 onto the feed wheel 104.

The rotary component 450 can prevent side loading of the shaft 460 and/or the housing 500, which is used to drive the rotation of the feed wheel 104. An increased size of the feed wheel 104 requires the force to be diverted from the shaft 460 and/or the housing 500 that rotates the feed wheel 104.

Figure 4C:
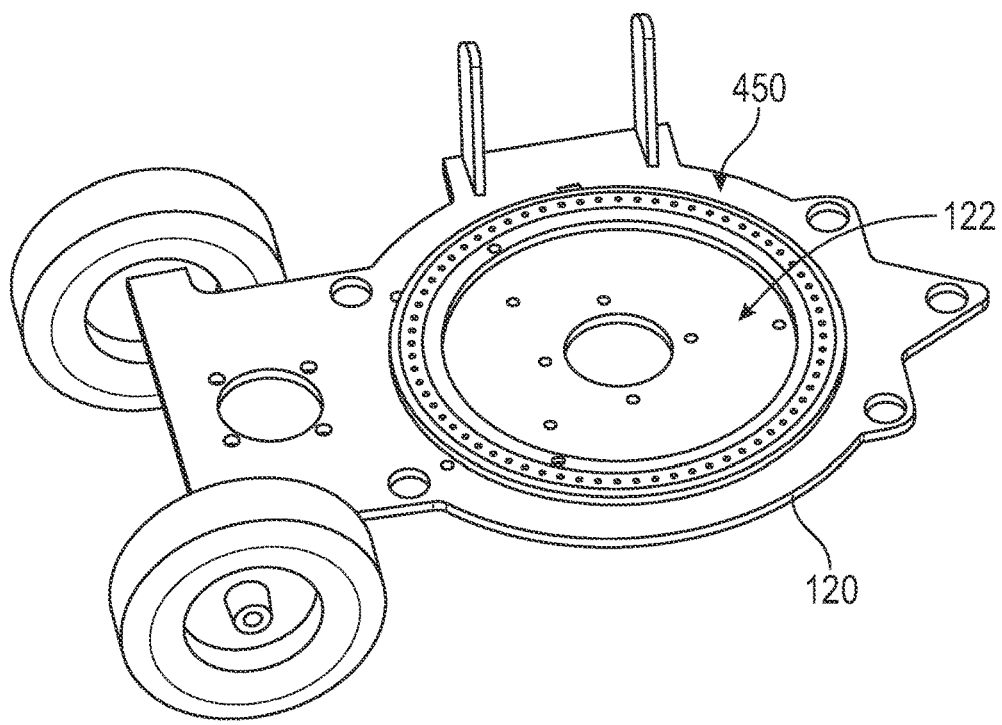
FIG. 4C illustrates the base including one or more bearings.
Figure 4D:
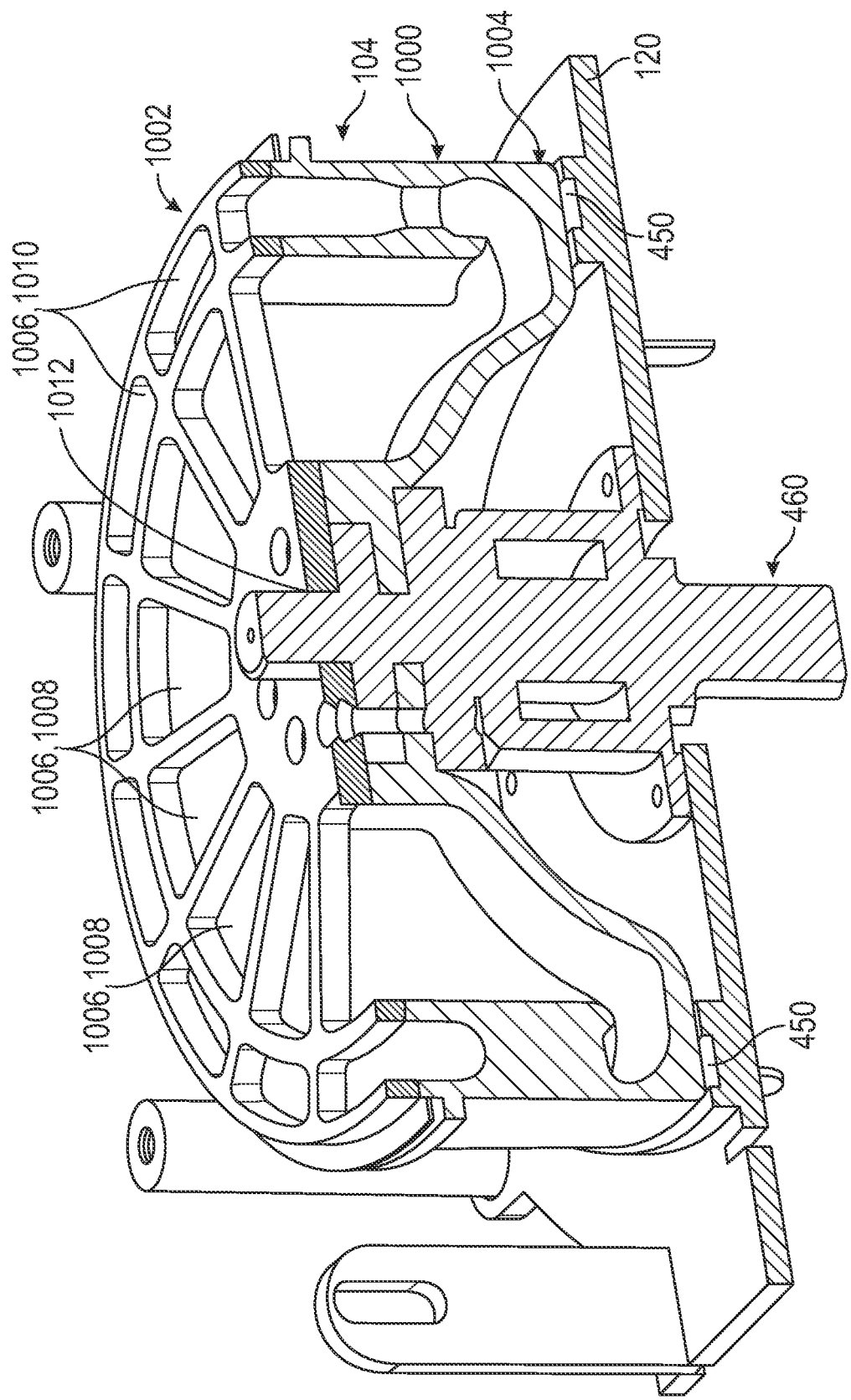
FIG. 4D illustrates a cross-sectional of the feed wheel on the base.

As shown in FIGS. 4C and 5B, the shaft 460 is operable to be received in a central aperture 1012 of the feed wheel 104. The central aperture 1012 can be formed through the central axis of the feed wheel 104 about which the feed wheel 104 is operable to rotate when in operation. The shaft 460 can be received in and/or coupled with the housing 500 of the base 120. The housing 500 can be coupled with the base 120. In some examples, the housing 500 can be integral with the base 120. The housing 500 and/or the shaft 460 can be operable to cause the feed wheel 104 to rotate about the central axis.

FIGS. 6A-7B illustrate examples of the wear pad 106. The practical realities of using an air compressor and the natural logistics of moving sand, cement, and gunite material around can lead to many problems. For example, most compressed air produced by air compressors is relatively hot. Outside of particularly arid deserts, most stored sand cannot help but be slightly wet from exposure to the elements. The sand used in the gunite system 1 may require a threshold moisture content so that it is not hydrophobic when introduced to the water at the source of the nozzle 64. A frequent problem with conventional gunite systems employing rotary feed systems is that the high heats endemic to the rotary mixing mechanism evaporates the water in the wet sand mixture, which then combines with the heat and pressure of the feed system to activate the catalyzation of the cement compounds. This causes the cement mixture to dry early and cake onto surfaces within the gunite mechanism, dramatically throttling the flow volume of the gunite system, potentially damaging vulnerable components, and threatening to deliver inappropriately active compounds into the flow of shotcrete which could threaten the structural integrity of the object being built.

Conventional gunite assemblies include a rubber wear pad to provide a seal between active and inactive mixing chambers of the feed wheel 104. Due to the friction created between surfaces during rotation and resulting dried cement mentioned above acting as an abrasive, the conventional wear pad experiences a high consumption rate and therefore its use requires continuous maintenance.

The present feed system 100 can include a liquid-cooled wear pad 106. The liquid-cooled wear pad 106 can include a chambered passage 622 operable to permit fluid (e.g., water) to flow through an interior of the wear pad 106. Although water can flow through chambered passage 622 of the liquid-cooled wear pad 106, in some examples, other type of fluid (e.g., hydraulic fluid, automatic transmission fluid (ATF)) can flow through the chambered passage 622 to lower the temperature of the wear pad 106. In some examples, the chambered passage 622 can include texture or features to reduce the flowrate of water through the chambered passage 622.

Flowing fluid through the liquid-cooled wear pad 106 can reduce and maintain the temperature of the wear pad 106 by counteracting heat from friction at interface of wear pad 106. Maintaining the temperature of the wear pad 106 during use may increase the service life of the wear pad 106. In at least one example, the wear pad 106 includes an inlet 110 and an outlet 112 in fluid communication with the chambered passage 622. The inlet 110 may be configured to permit the fluid to flow into the chambered passage 622 and the outlet 112 may be configured to permit the fluid to flow out of the chambered passage 622. The inlet 110 can be operable to be coupled with a fluid source, such as a water hose. The inlet 110 can be in fluid communication with an inlet opening 620 that opens to the chambered passage 622. The fluid can then flow in the chambered passage 622 throughout the inside of the wear pad 106. An outlet opening 624 can open up to another end of the chambered passage 622 opposite the inlet opening 620. The outlet opening 624 can be in fluid communication with the outlet 112. The fluid can into the outlet opening 624 and out the wear pad 106 through the outlet 112.

Figure 6A:
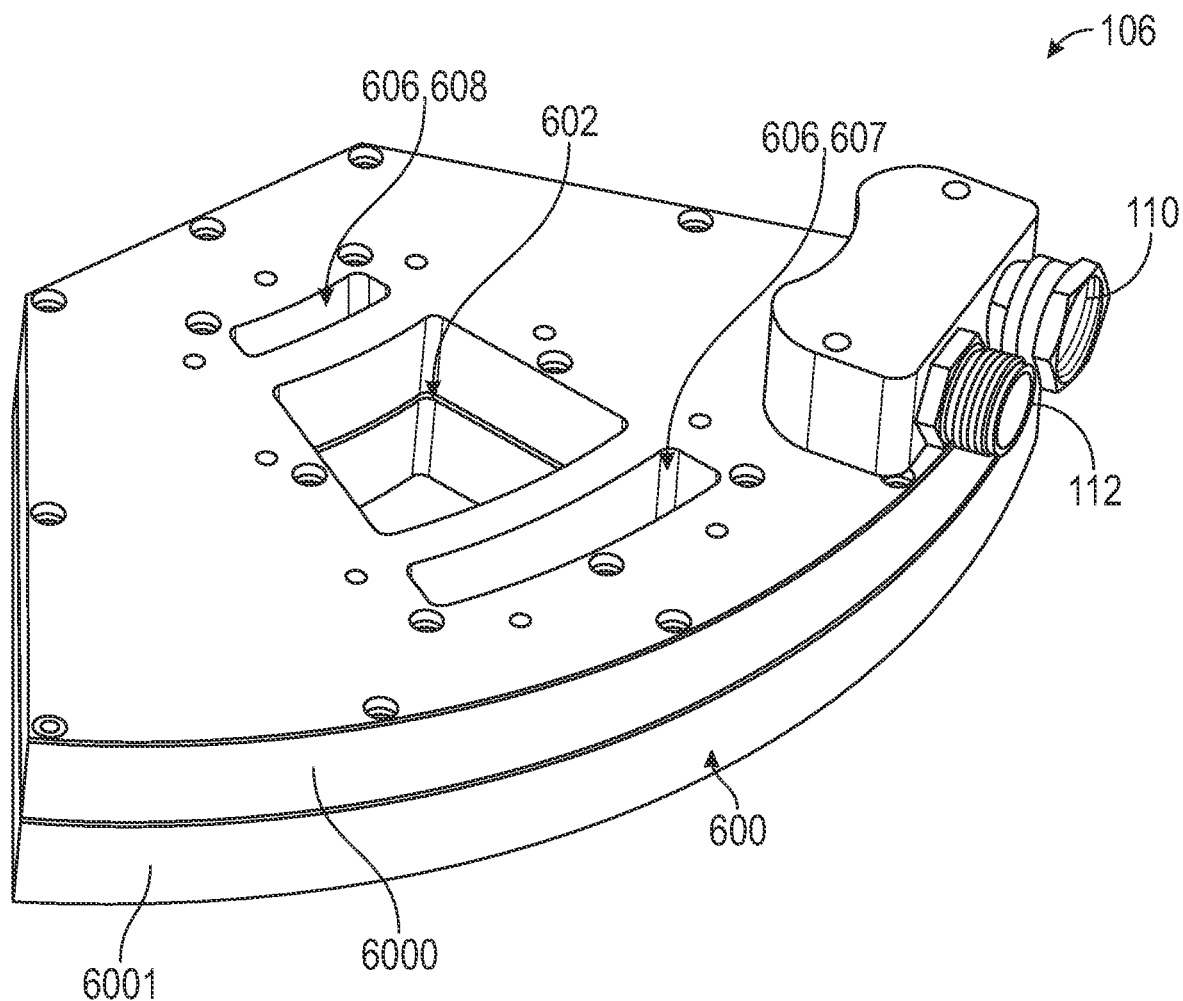
FIG. 6A illustrates a wear pad.
Figure 6B:
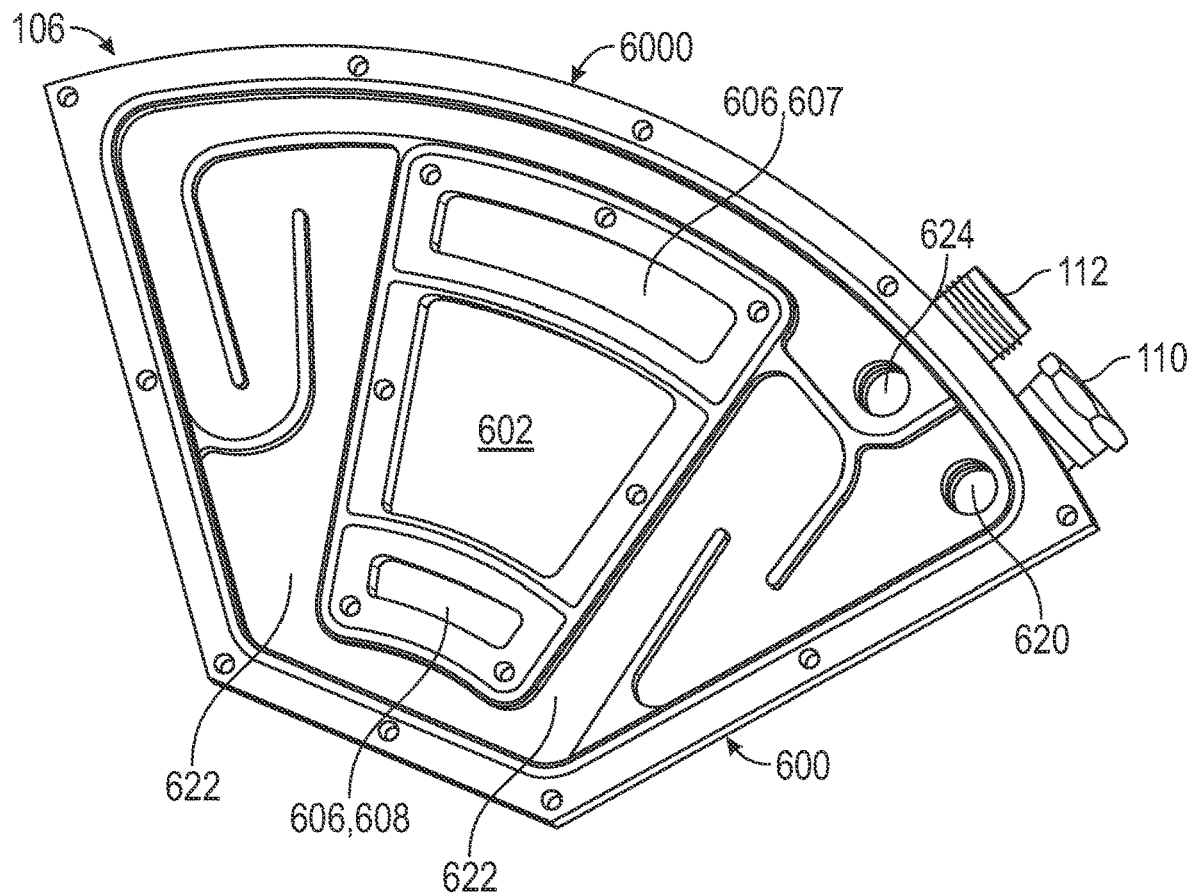
FIG. 6B illustrates a first portion of the wear pad.
Figure 6C:
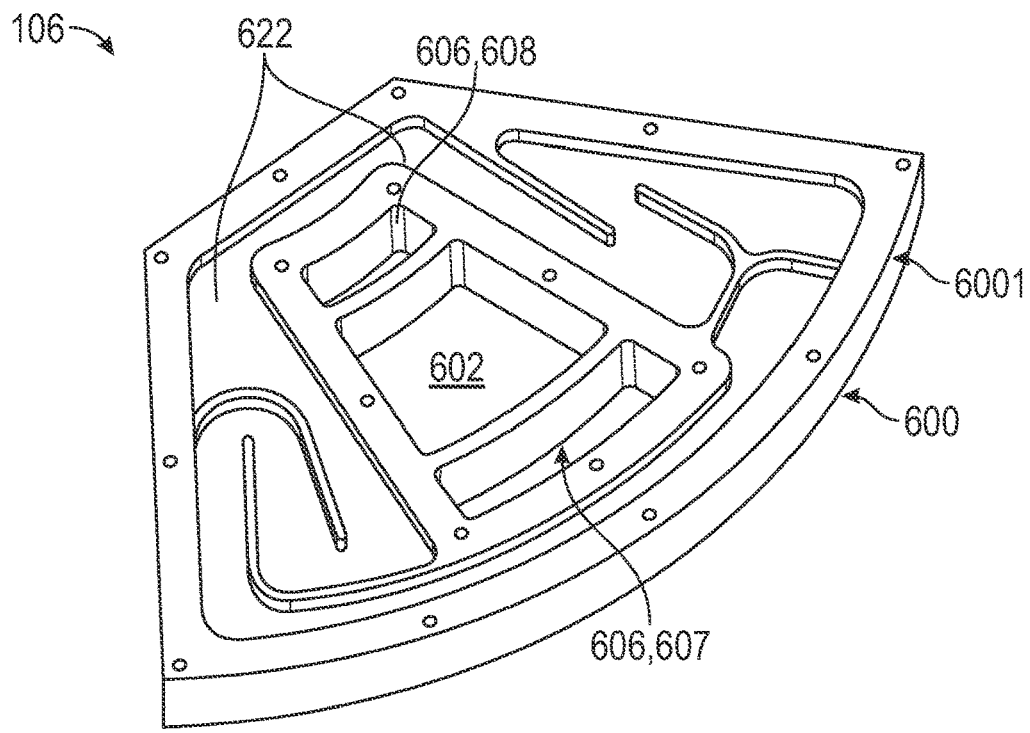
FIG. 6C illustrates a second portion of the wear pad.
Figure 7A:
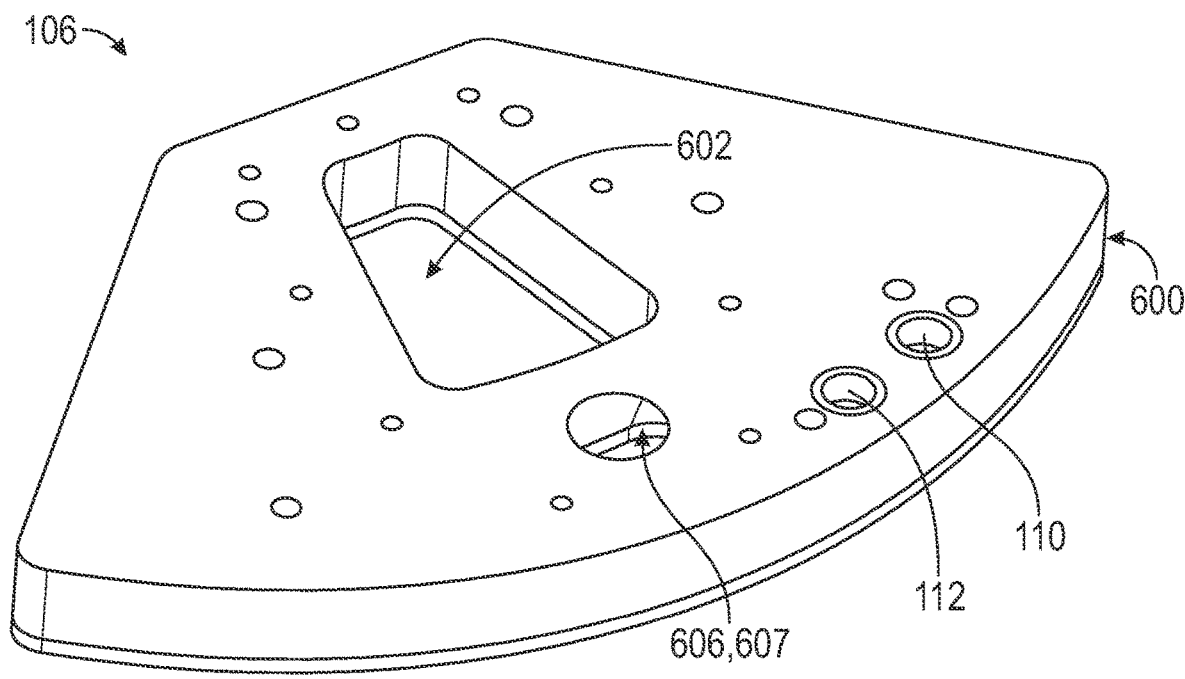
FIG. 7A illustrates another example of a wear pad.
Figure 7B:
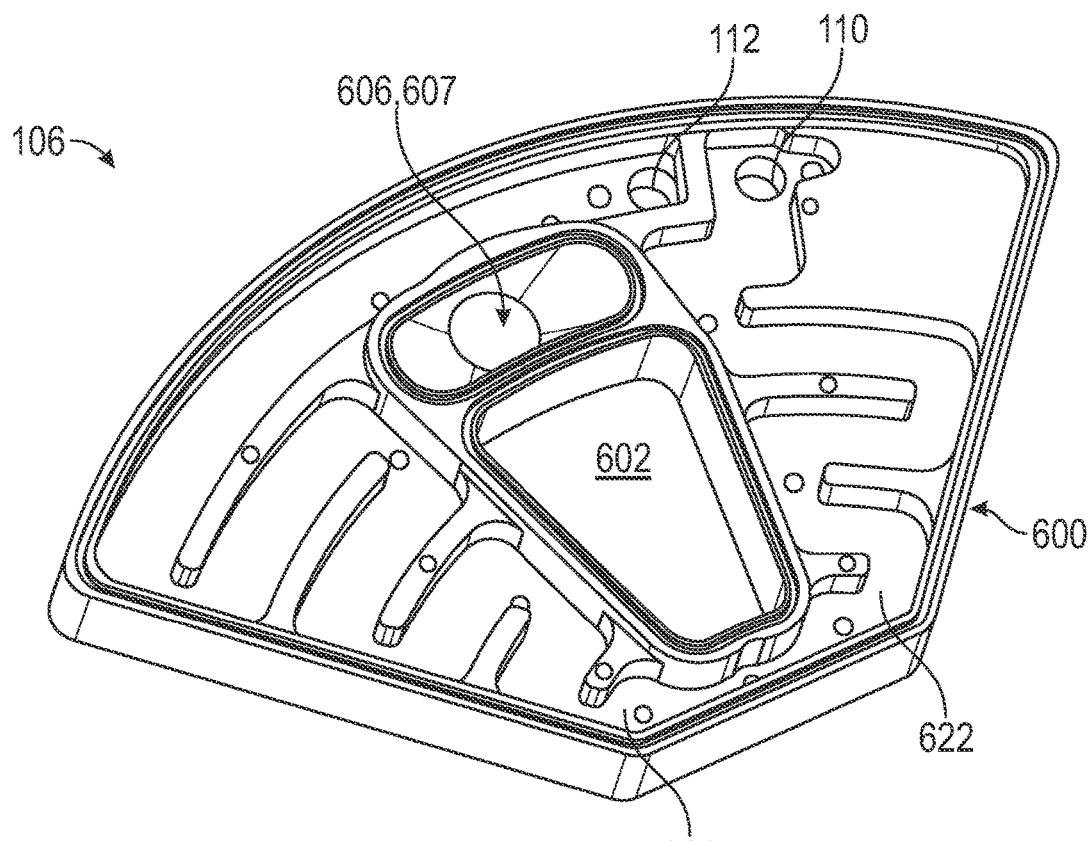
FIG. 7B illustrates a cross-sectional of the wear pad of FIG. 7A.
Figure 8A:
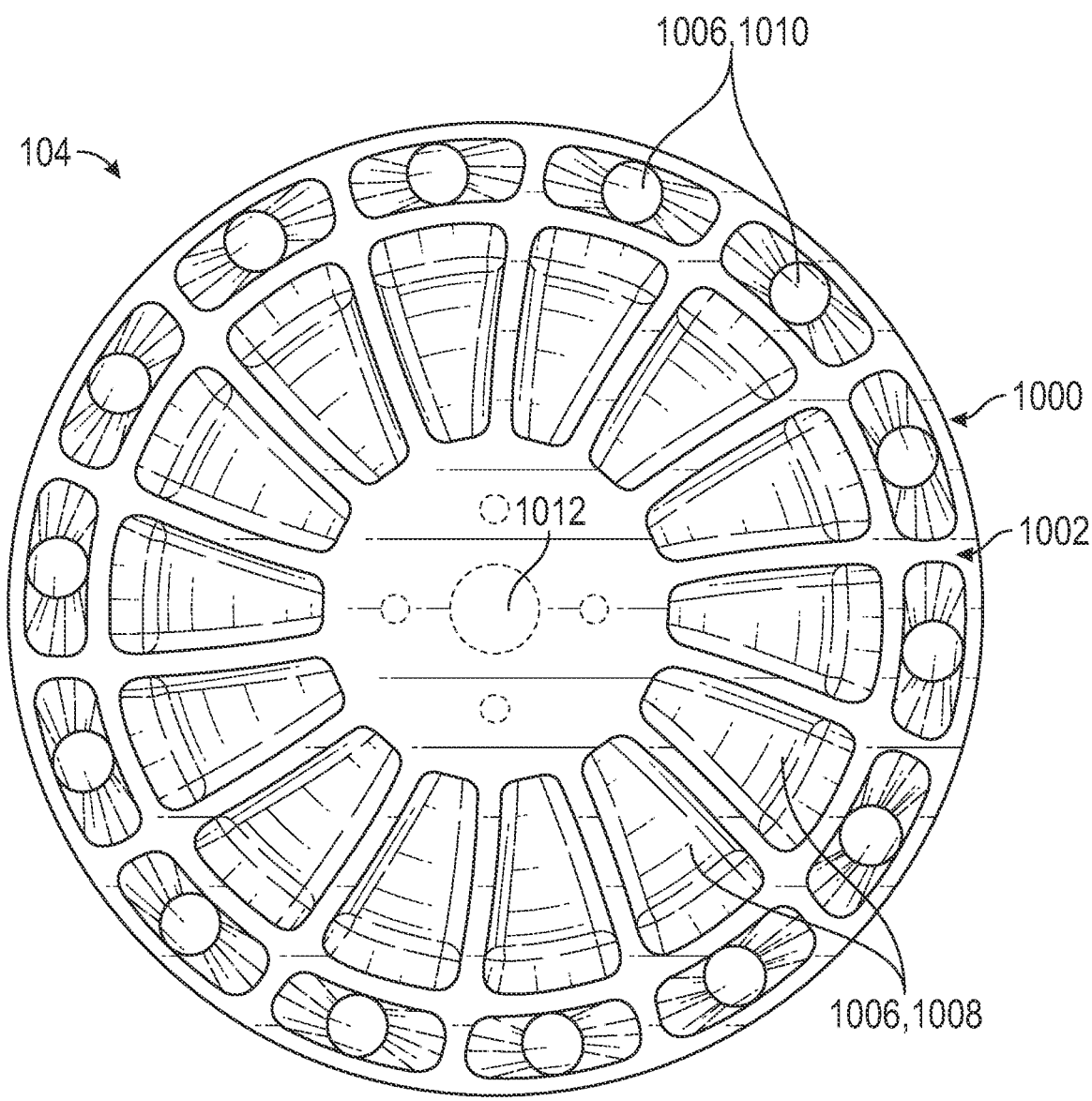
FIG. 8A illustrates a top view of a feed wheel with outer pressure ports.
Figure 8B:
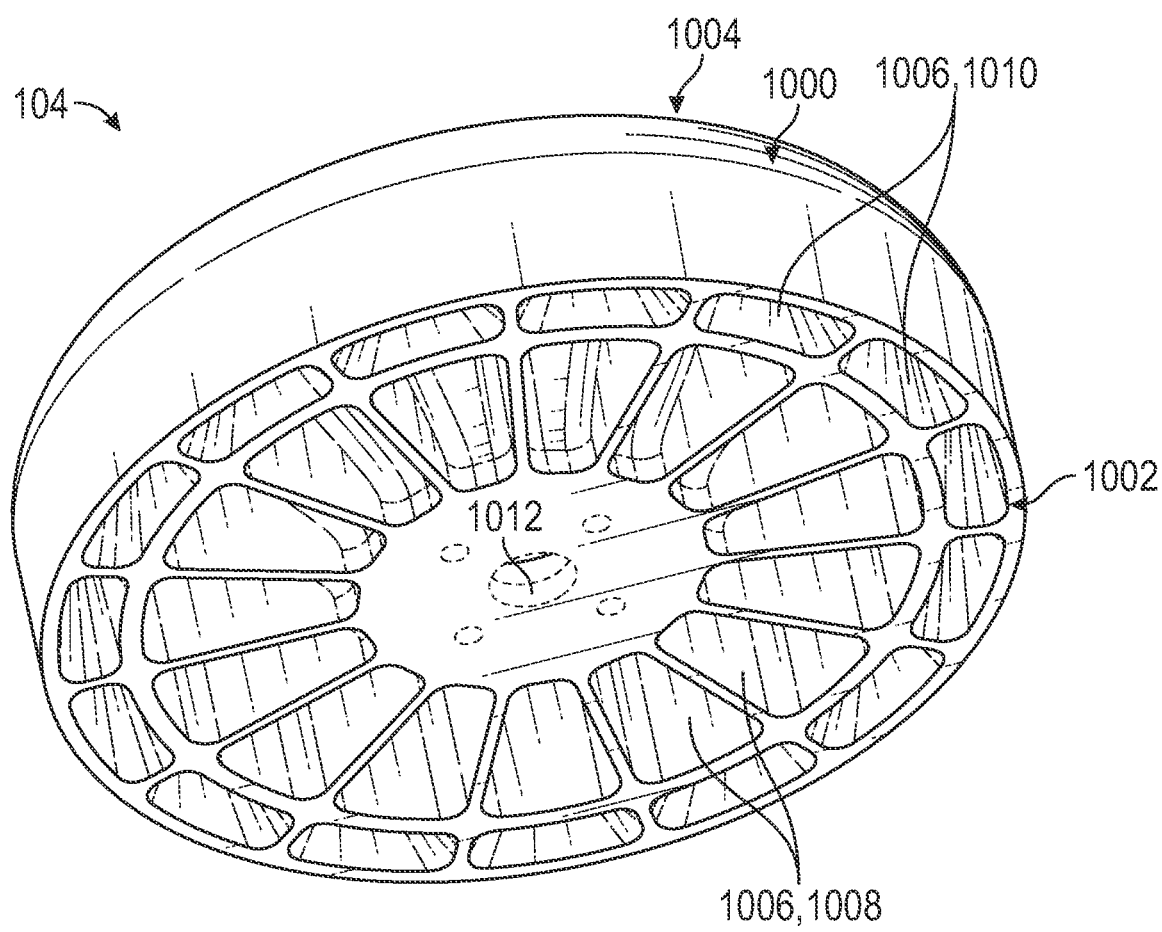
FIG. 8B illustrates a bottom perspective view of the feed wheel of FIG. 8A
Figure 8C:
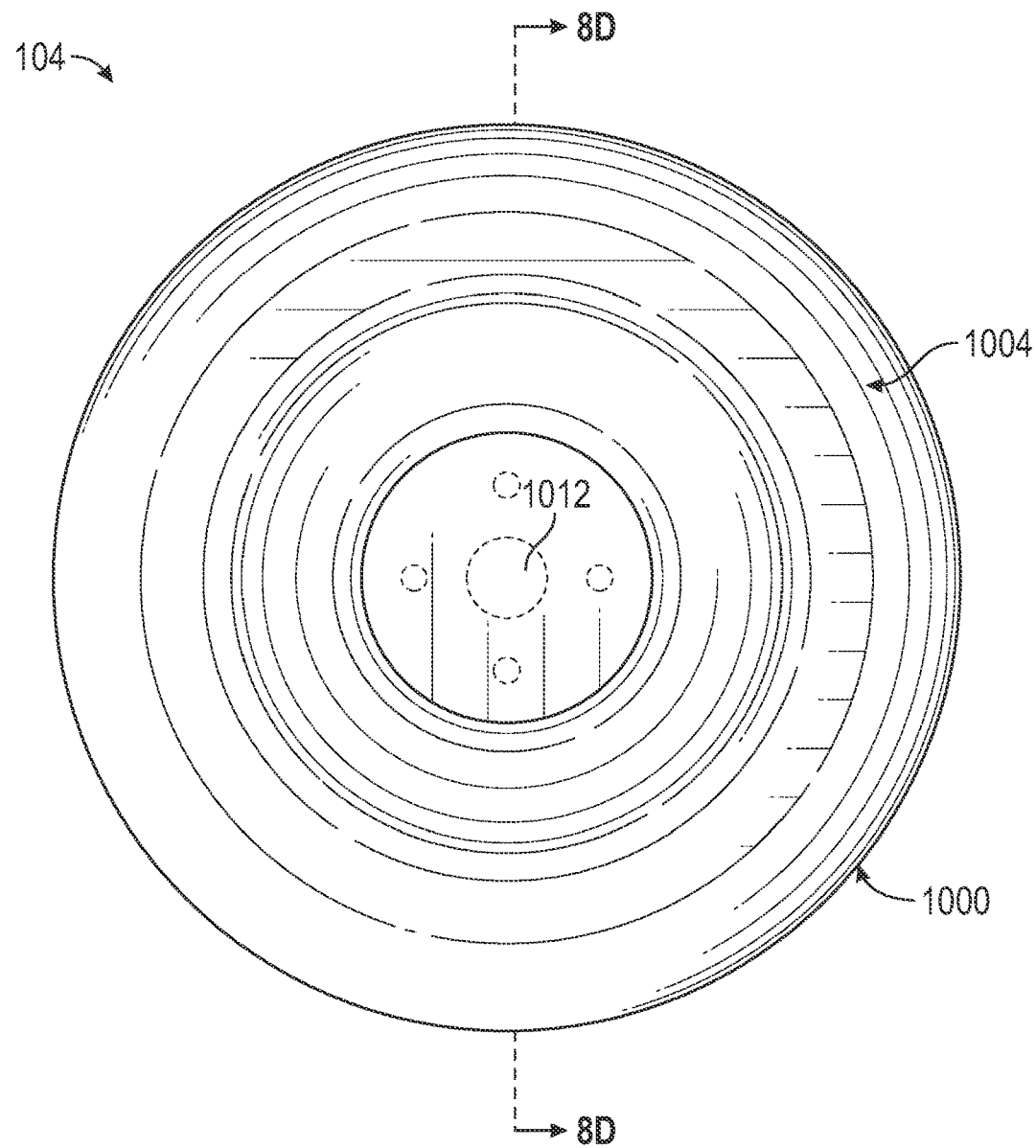
FIG. 8C illustrates a bottom view of the feed wheel of FIG. 8A.
Figure 8D:
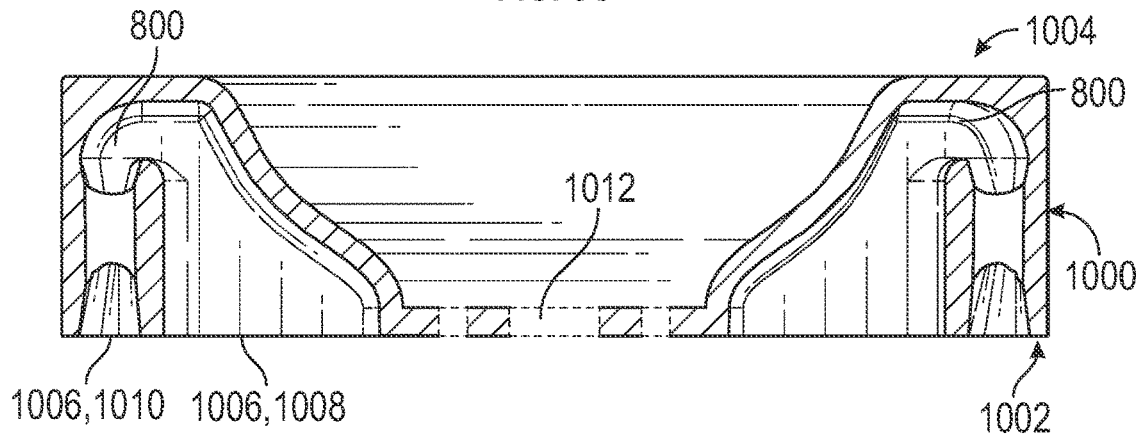
FIG. 8D illustrates a cross-sectional view of the feed wheel, taken along line 8D-8D of FIG. 8C.

In at least one example, the liquid-cooled wear pad 106 can form one or more air openings 606 through the thickness of the wear pad 106 to allow air to pass through the wear pad 106 and flow to the feed wheel 104. For example, the one or more air openings 606 can correspond with at least one corresponding pressure port 1010, 1011 such that the pressurized gas can flow through the feed wheel 104 to discharge the material received therein. FIGS. 6A-6C illustrate the wear pad 106 including both an inner air opening 608 and an outer air opening 607 that can correspond with an inner pressure port 1011 and an outer pressure port 1010 (as shown, for example, in FIGS. 9A-9C). FIGS. 7A and 7B illustrate the wear pad 106 including only an outer air opening 607 that can correspond with an outer pressure port 1010 (as shown, for example, in FIGS. 8A-8D). The wear pad 106 can include a material opening 602 to allow the material flowing upward and outward from the feed wheel 104 to pass through the wear pad 106 and flow to the discharge. The material opening 602 can correspond with a material port 1008 of the feed wheel 104. In at least one example, the material opening 602 can be configured in a triangular or trapezoidal shape. In other examples, the material opening 602 can be configured in a circular, oval, rectangular, and or any other suitable shape without deviating from the scope of the disclosure.

In at least one example, as discussed above, the wear pad 106 can be operable to be coupled with the delivery gun assembly 300. The air opening(s) 606 can correspond with and be in fluid communication with the pneumatic supply 114, and the material opening 602 can correspond with and be in fluid communication with the discharge conduit 116.

In at least one example, the liquid-cooled wear pad 106 can include at least one portion that is operable to transfer heat between the fluid and the wear pad 106 so that the fluid can lower the temperature of the wear pad 106. In at least one example, the liquid-cooled wear pad 106 can be at least partially made of metal (i.e., a liquid-cooled metallic wear pad assembly), which can include ferrous and/or non-ferrous metal. In at least one example, the liquid-cooled wear pad 106 can be constructed of hardened steel. For example, the liquid-cooled wear pad 106 may be constructed of chromoly. In conjunction with the liquid-cooled wear pad 106, a metallic wear pad 106 can provide the sealing benefits of the traditional rubber pad with wear resistant properties resulting in increased life and therefore less on-going maintenance.

In at least one example, the liquid-cooled wear pad 106 can include two components (e.g., a top component 6000 and a bottom component 6001) that are coupled together. In some examples, the two components 6000, 6001 can be removably coupled together with a seal in between. In at least one example, the top component 6000 and the bottom component 6001 can be bolted together. In some examples, the two components 6000, 6001 can be welded together. In some examples, the top component 6000 can include aluminum. In some examples, the top component 6000 can include bronze aluminum. In some examples, the bottom component 6001 can include bronze aluminum. In some examples, the bottom component 6001 can include hardened steel.

FIGS. 8A-11C illustrate the feed wheel 104. The feed wheel 104 can be operable to receive and discharge the material into the delivery system 60 to be dispensed onto the surface 200. The feed wheel 104 can include a body 1000 forming a plurality of material ports 1008 and a plurality of pressure ports 1010, 1011. The body 1000 can include a top surface 1002 and a bottom surface 1004 opposite the top surface 1002. The body 1000 can be operable to rotate about the central axis (e.g., the central aperture 1012 formed in the center of the body 1000).

The material ports 1008 can be operable to receive the material (e.g., from the feeding hopper 102 and/or from the delivery connection 61). The pressure ports 1010, 1011 can be operable to receive pressurized gas when in registration with the pneumatic supply 114. Each of the pressure ports 1010, 1011 are in fluid communication with a corresponding material port 1008 such that when a pressure port 1010, 1011 receives the pressurized gas, the pressurized gas discharges the material from the corresponding material port 1008 out of the top surface 1002 of the body 1000.

The material ports 1008 and the pressure ports 1010, 1011 can be aligned such that the material ports 1008 and the pressure ports 1010, 1011 are formed in a substantially circular array around the central axis. The material ports 1008 and the pressure ports 1010, 1011 can be defined by the top surface 1002 of the body 1000. Accordingly, the openings of the ports 1006 can be open to the top surface 1002 of the body 1000 while the ports 1006 can extend towards the bottom surface 1004 of the body 1000. In some examples, the bottom of the ports 1006 can be proximate the bottom surface 1004 of the body 1000.

As illustrated in FIGS. 8A-11C, the feed wheel 104 includes a plurality of outer pressure ports 1010. In some examples, as illustrated in FIGS. 8A-8D and 10A-10D, the feed wheel 104 can only include the outer pressure ports 1010. The outer pressure ports 1010 can be positioned proximate the perimeter of the body 1000 of the feed wheel 104. The material ports 1008 can be positioned between the outer pressure ports 1010 and the central axis (e.g., the central aperture 1012).

In at least one example, as illustrated in FIGS. 8A-11C, the outer pressure ports 1010 can be fluidly connected with the corresponding material port 1008 via an outer duct 800. The outer duct 800 can be connected with the material port 1008 proximate the bottom of the material port 1008. In some examples, the outer duct 800 can be connected to the corresponding material port 1008 proximate the bottom surface 1004 of the body 1000. Accordingly, the pressurized gas flows to the bottom of the material port 1008 to expel the material received therein out of the top surface 1002 of the body 1000.

The outer pressure ports 1010 can be positioned closer to and/or adjacent to the periphery of the feed wheel 104 into an opening structurally redesigned to maximize exposure of the particulate matter to the pneumatic pressure. The pneumatic pressure is operable to push the material contained within one or more corresponding material ports 1008 upward and out of the feed wheel 104. In some examples, the feed wheel 104 reduces pressure drop (e.g., less restriction at the same inlet pressure) in comparison to conventional feed wheels where only inside pressure ports are provided. Accordingly, more material can be pushed out of the material ports 1008 of the feed wheel 104 with the same amount of pressure in comparison to conventional feed wheels where only inside pressure ports are provided.

In at least one example, in addition to the changes in the number and/or position of the ports, the physical geometry of the ports 1006 can be changed to better optimize the increased exposure time and flow rates of the pneumatic fluid, improving the amount of pressurized force compelling the solid particulate mixture into the dispensation mechanism. In at least one example, as illustrated in FIGS. 8A-8D, at least one of the material ports 1008 and/or the outer pressure ports 1010 can be substantially linear. In at least one example, as illustrated in FIGS. 10A-10D, at least one of the material ports 1008 and/or the outer pressure ports 1010 can have a turbine geometry. Instead of the edge of the wear pad 106 and the feed wheel 104 being coincident along the entire edge, either the edge of the wear pad 106 or the edge of the feed wheel 104 can include at least one curved edge. The turbine-like design may provide additional benefits. For example, as the opening passes edge of the wear pad 106 it provides a sweeping effect that sheers sand off at a singular point rather than meeting a hard edge with previous pocket design which causes sand to enter between the two surfaces, reducing wear pad 106 and feed wheel 104 life.

In some examples, as illustrated in FIGS. 9A-9D and 11A-11C, the feed wheel 104 can include a plurality of inner pressure ports 1011 as well as the outer pressure ports 1010. The inner pressure ports 1011 can be formed in the body 1000. For example, the inner pressure ports 1011 can be defined by the top surface 1002 of the body 1000. The inner pressure ports 1011 can be positioned radially inward in relation to the material ports 1008. For example, the material ports 1008 can be positioned between the inner pressure ports 1011 and the outer pressure ports 1010. The inner pressure ports 1011 can be positioned between the central axis (e.g., the central aperture 1012) and the material ports 1008. In such a configuration, the material ports 1008, the outer pressure ports 1010, and the inner pressure ports 1011 can be aligned to be formed in a substantially circular array around the central axis.

Similar to the outer pressure ports 1010, the inner pressure ports 1011 can be operable to receive pressurized gas when in registration with the pneumatic supply 114 as the body 1000 rotates about the central axis. Each of the inner pressure ports 1011 can be in fluid communication with the corresponding material port 1008 such that when an inner pressure port 1011 receives the pressurized gas, the pressurized gas discharges the material from the material port 1008 out of the top surface 1002 of the body 1000.

Figure 9A:
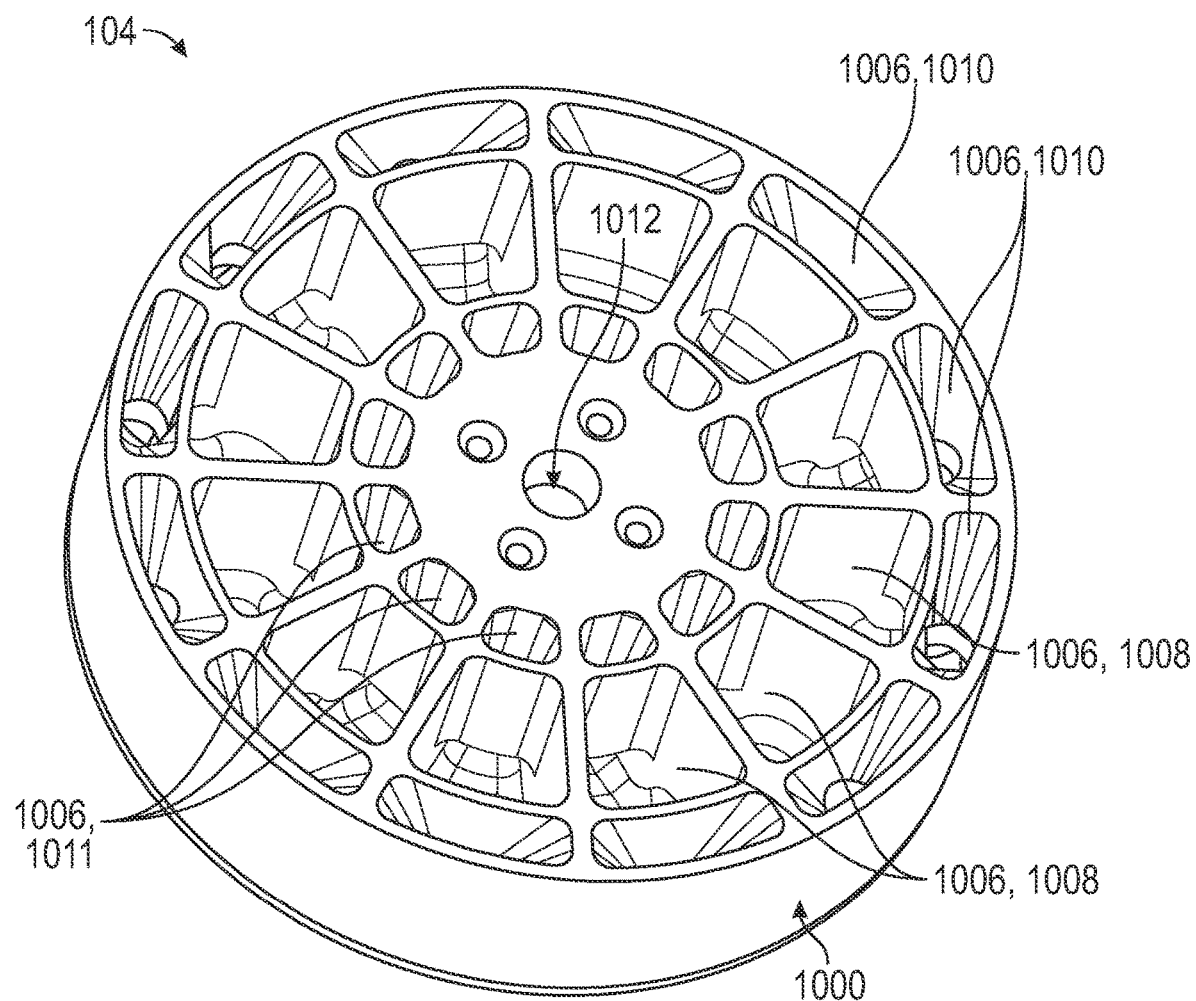
FIG. 9A illustrates a top perspective view of a feed wheel with outer pressure ports and inner pressure ports.
Figure 9B:
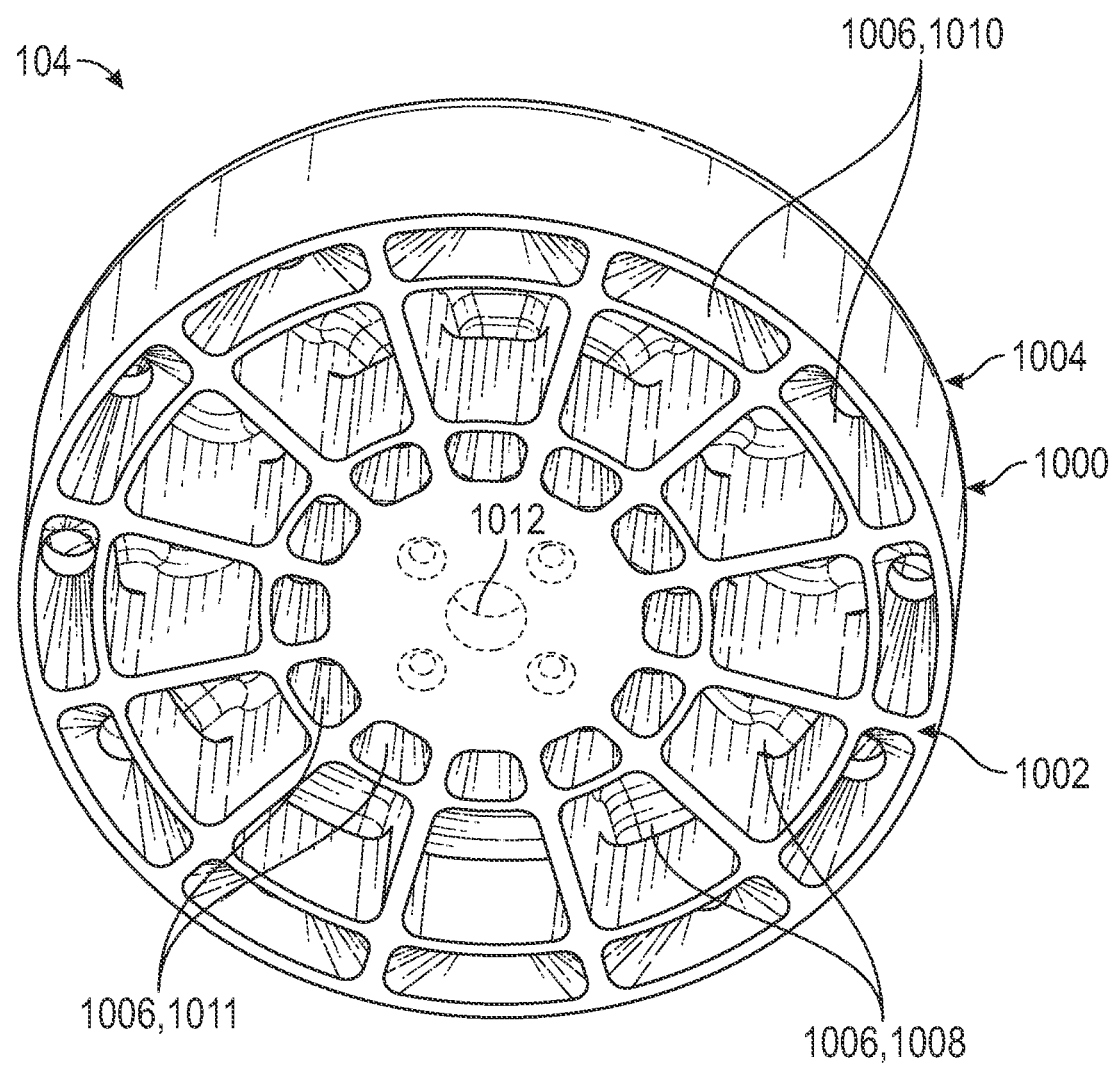
FIG. 9B illustrates a perspective view of the feed wheel of FIG. 9A.
Figure 9C:
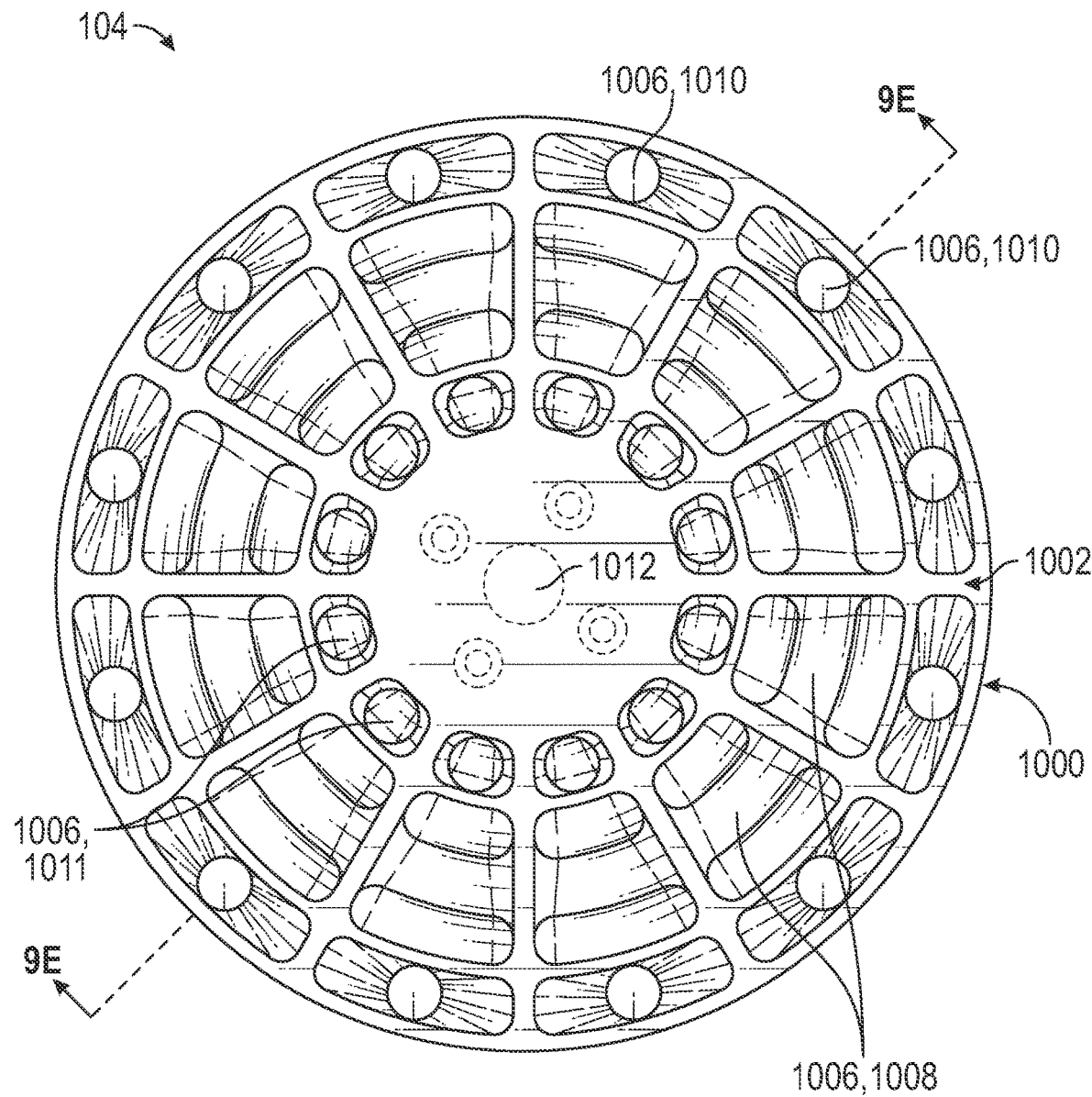
FIG. 9C illustrates a top view of the feed wheel of FIG. 9A.
Figure 9D:
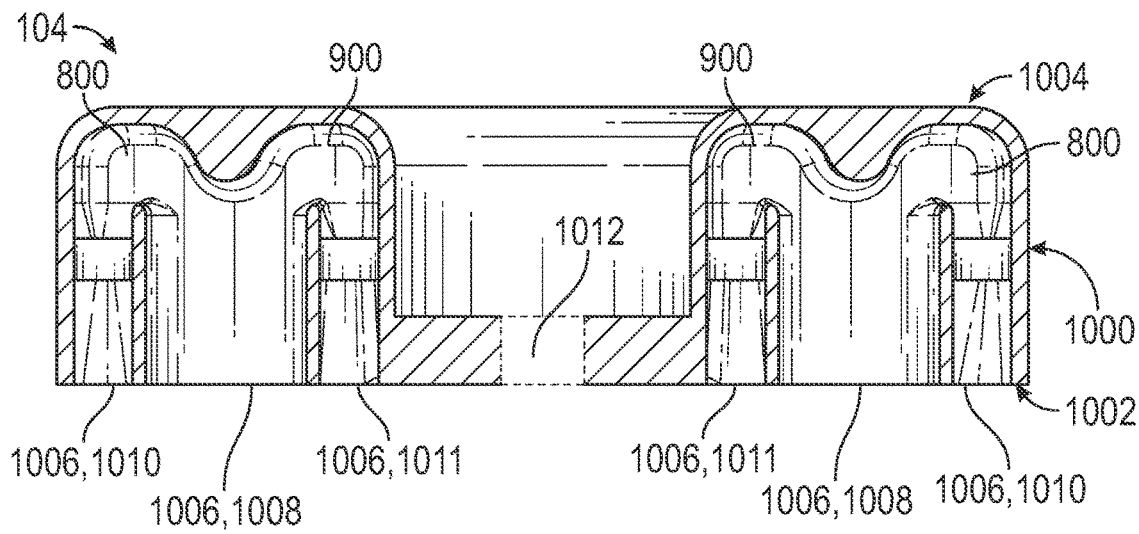
FIG. 9D illustrates a cross-sectional view of the feed wheel, taken along line 9D-9D of FIG. 9C.
Figure 10A:
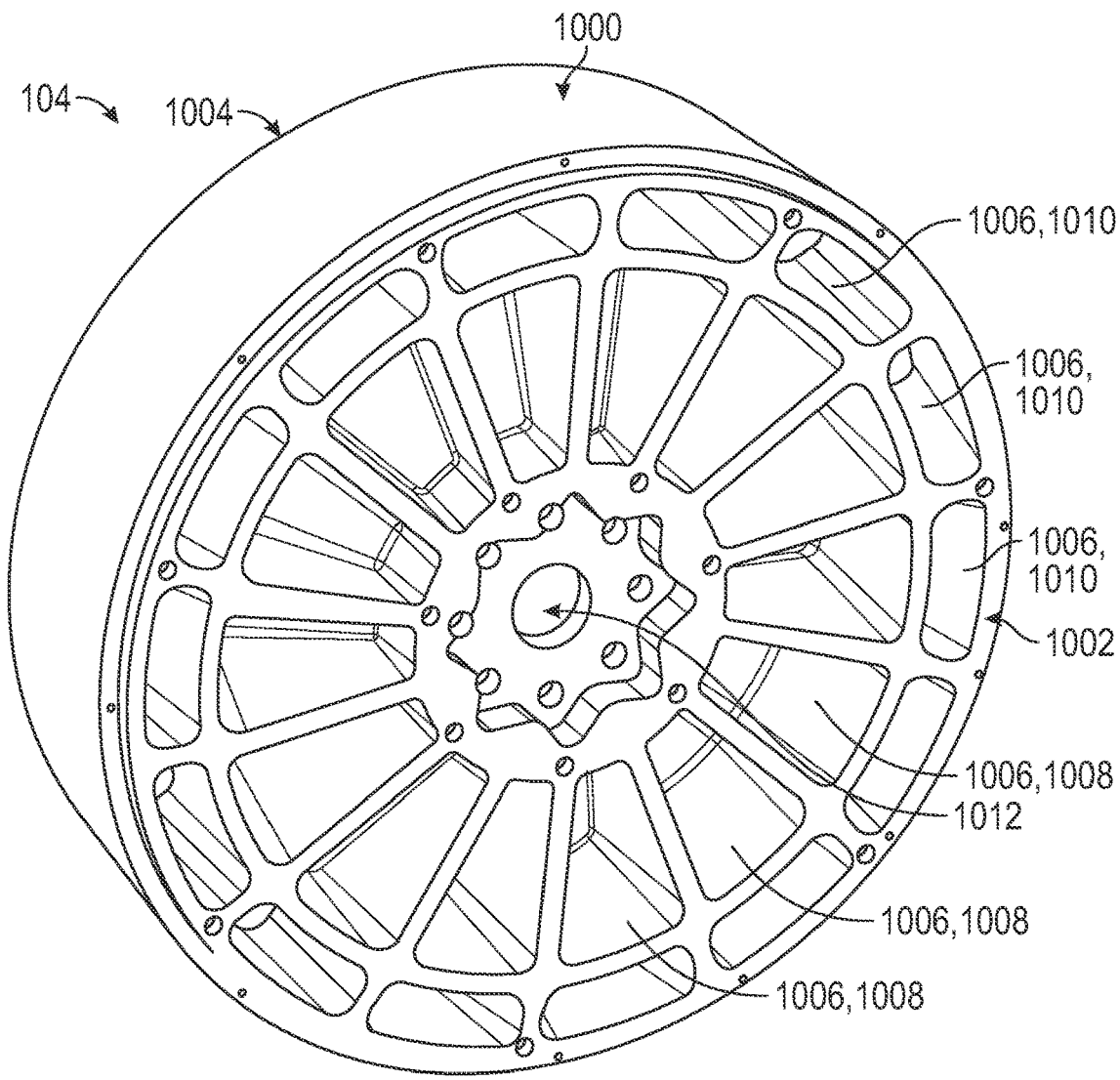
FIG. 10A illustrates a perspective view of a feed wheel with outer pressure ports, where the chambers have a turbine geometry.
Figure 10B:
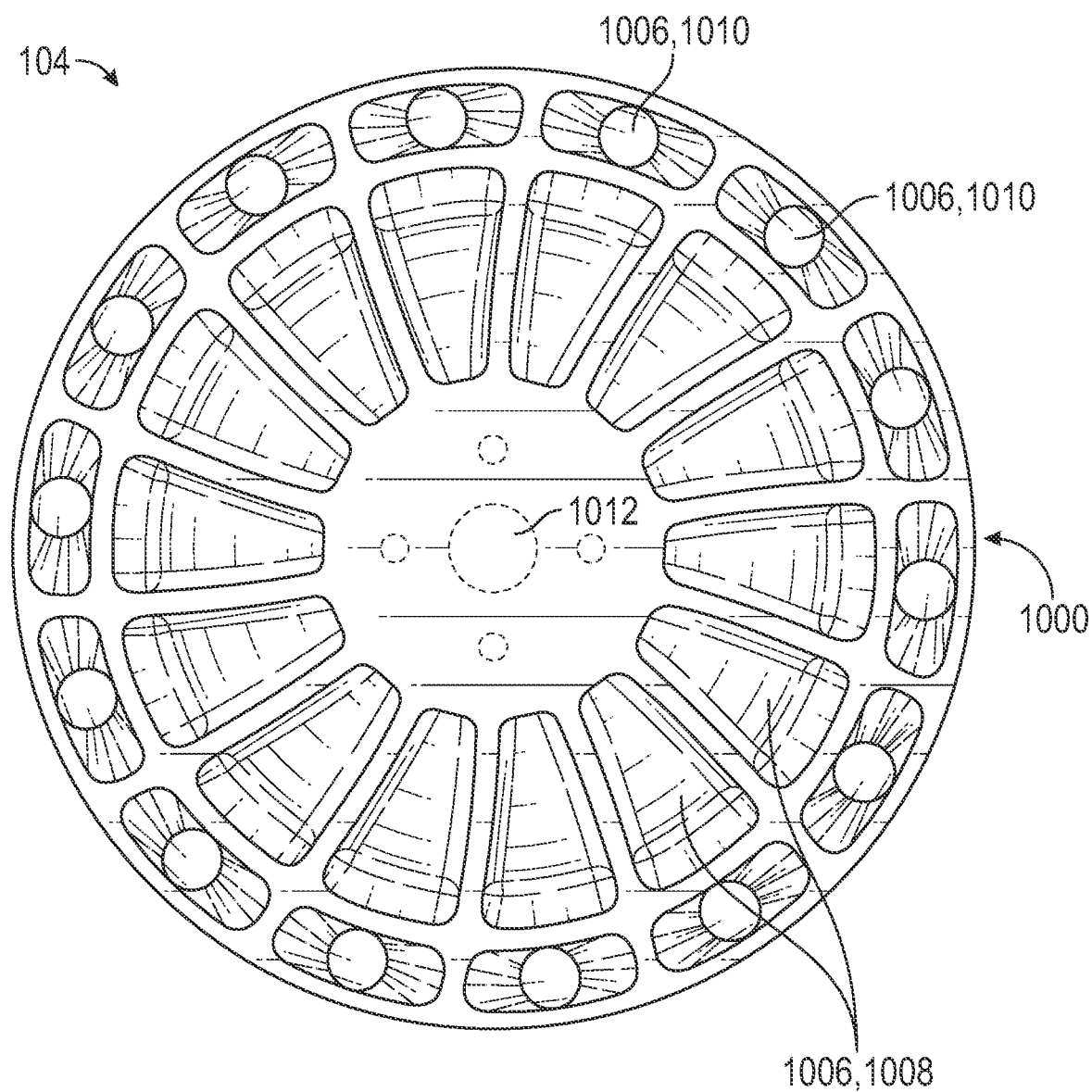
FIG. 10B illustrates a top view of the feed wheel of FIG. 10A.
Figure 10C:
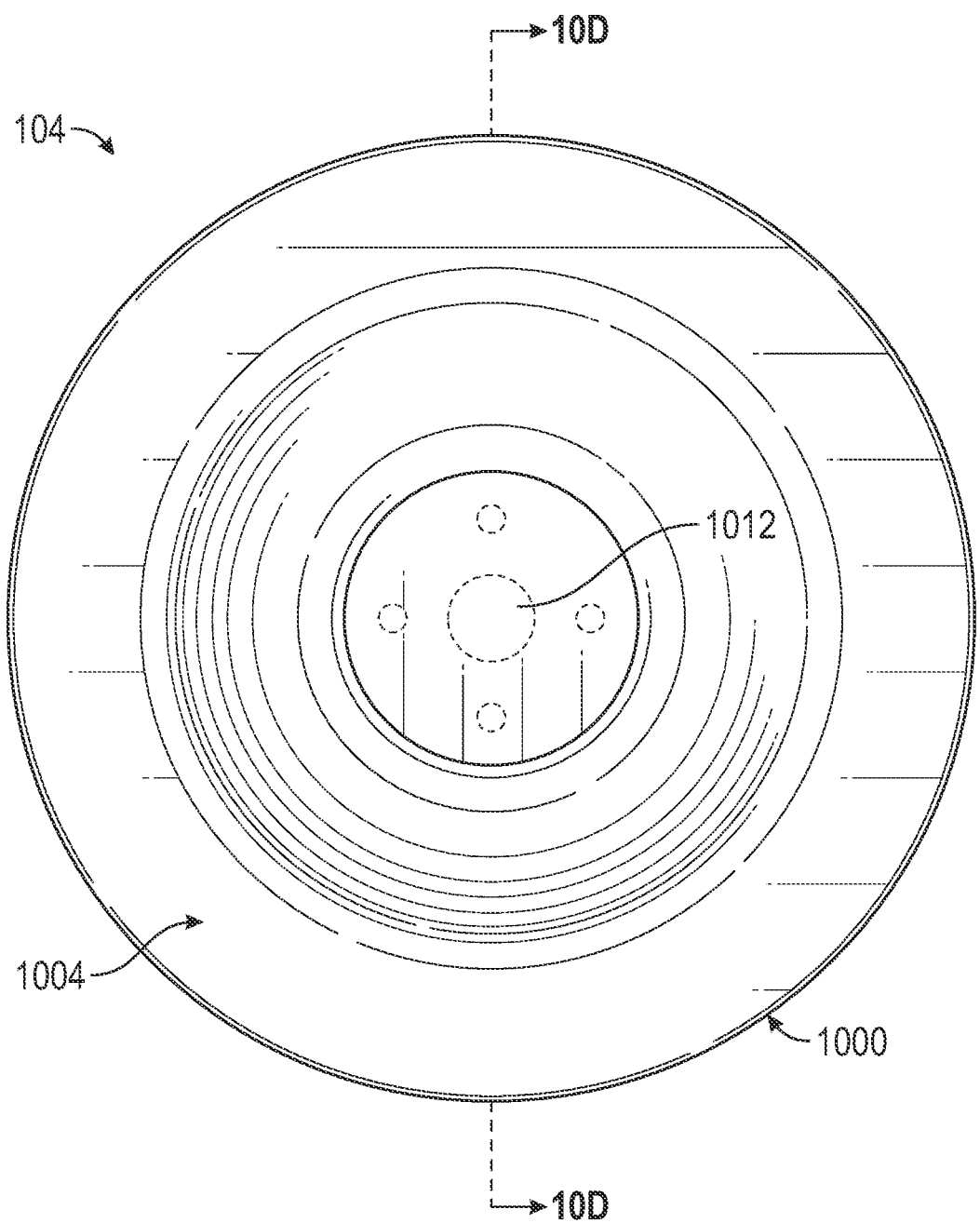
FIG. 10C illustrates a bottom view of the feed wheel of FIG. 10A.
Figure 10D:
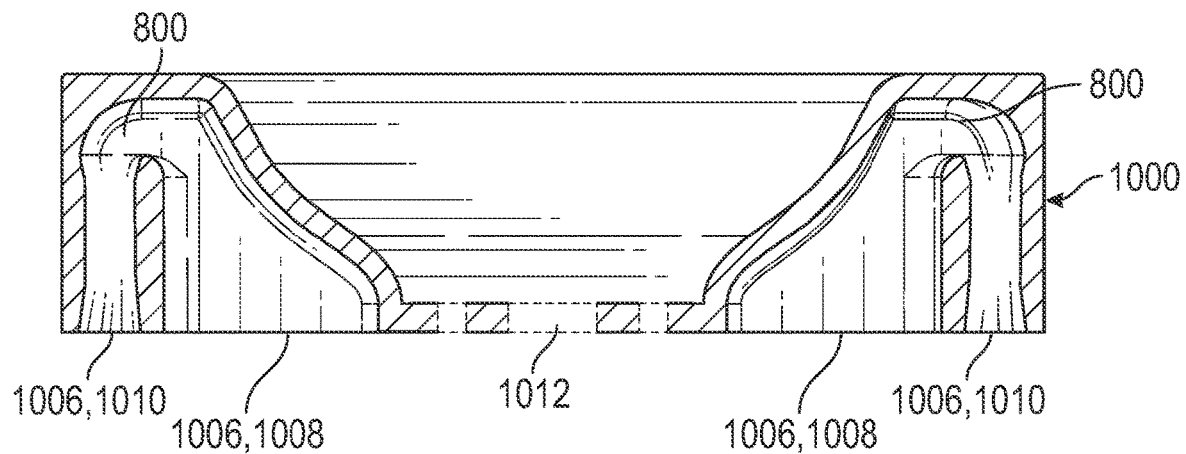
FIG. 10D illustrates a cross-sectional view of the feed wheel, taken along line 10D-10D of FIG. 10C.
Figure 11A:
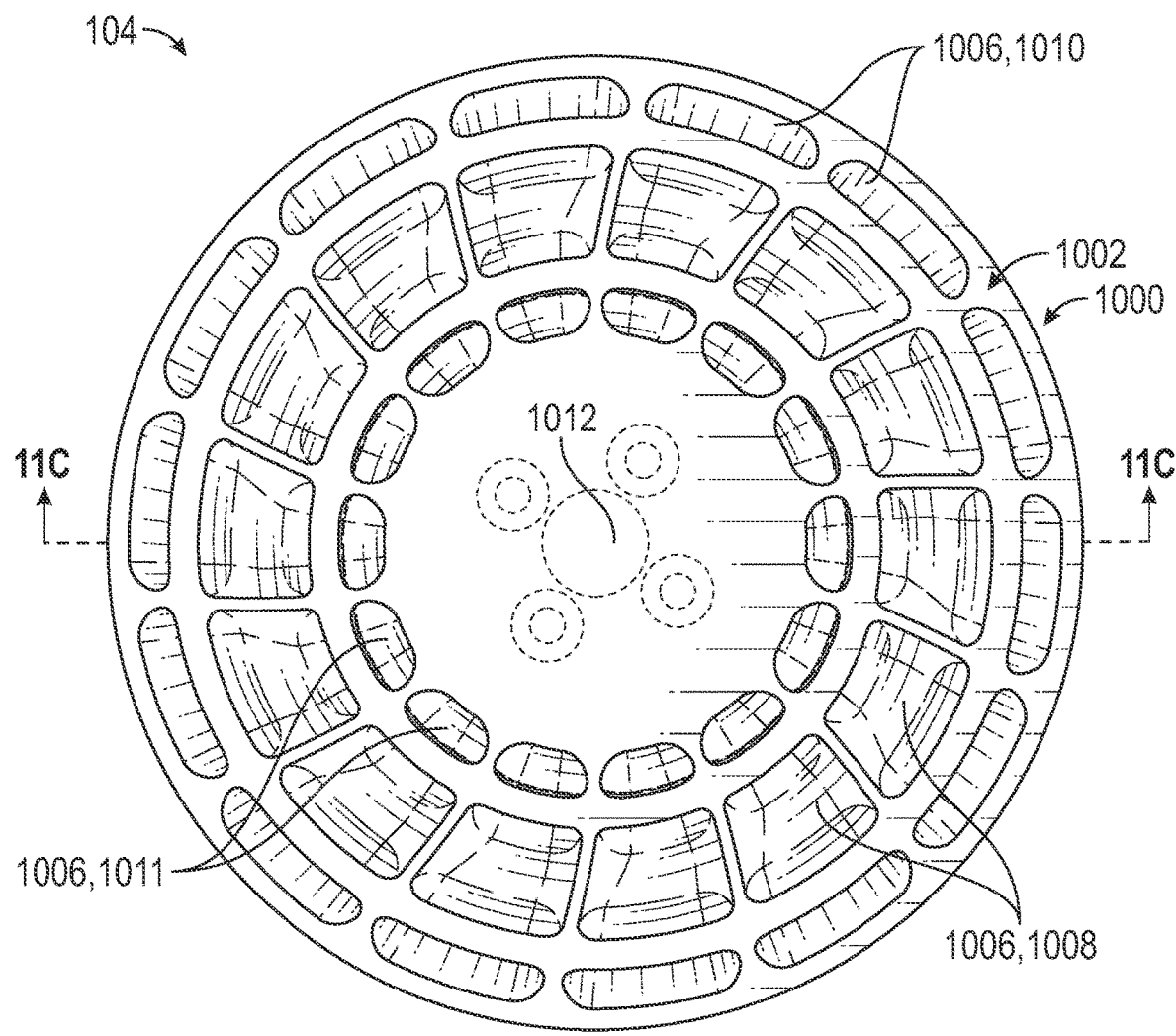
FIG. 11A illustrates a top view of a feed wheel with outer pressure ports and inner pressure ports, where the chambers have a turbine geometry.
Figure 11B:
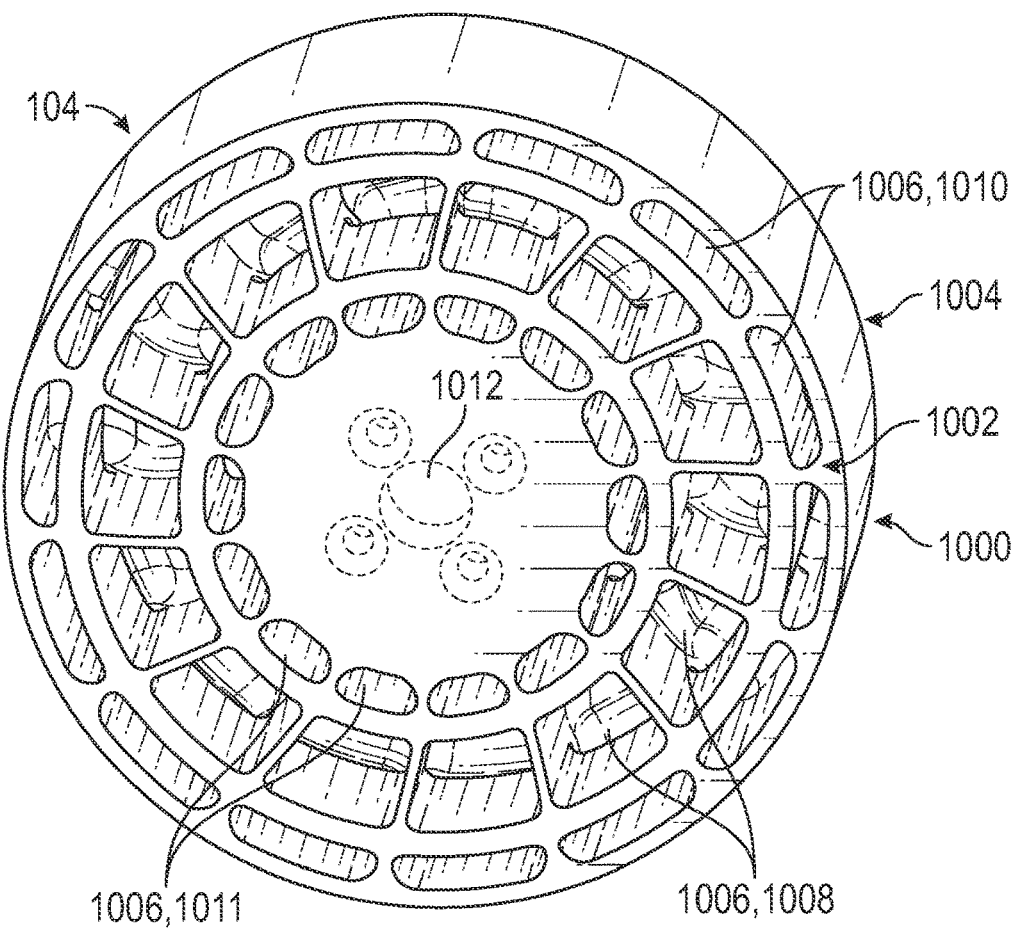
FIG. 11B illustrates a perspective view of the feed wheel of FIG. 11A.
Figure 11C:
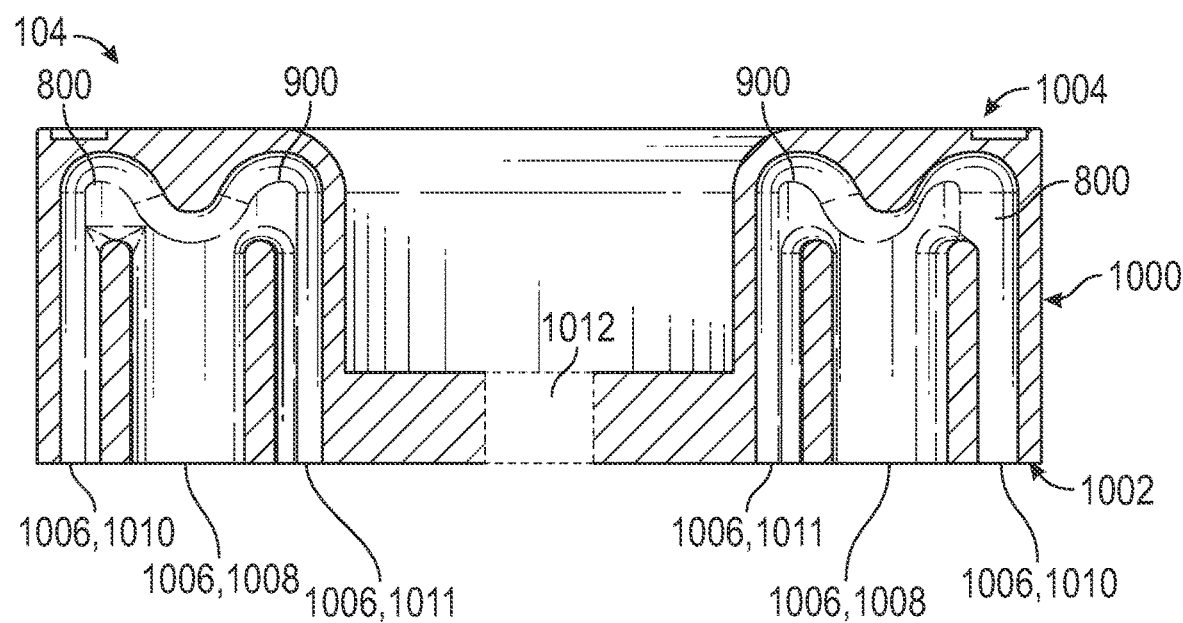
FIG. 11C illustrates a cross-sectional view of the feed wheel of FIG. 11A.

In at least one example, as illustrated in FIGS. 9D and 11C, the inner pressure ports 1011 can be fluidly connected with the corresponding material port 1008 via an inner duct 900. The inner duct 900 can be connected with the material port 1008 proximate the bottom of the material port 1008. In some examples, the inner duct 900 can be connected to the corresponding material port 1008 proximate the bottom surface 1004 of the body 1000. Accordingly, the pressurized gas flows to the bottom of the material port 1008 to expel the material received therein out of the top surface 1002 of the body 1000.

In at least one example, in addition to the changes in the number and/or position of the ports, the physical geometry of the ports 1006 can be changed to better optimize the increased exposure time and flow rates of the pneumatic fluid, improving the amount of pressurized force compelling the solid particulate mixture into the dispensation mechanism. In some examples, as illustrated in FIGS. 11A-11C, at least one of the inner pressure ports 1011, the material ports 1008, and/or the outer pressure ports 1010 can have a turbine geometry.

In at least one example, in addition to the changes in the number and/or position of the ports, the physical geometry of the ports 1006 can be changed to better optimize the increased exposure time and flow rates of the pneumatic fluid, improving the amount of pressurized force compelling the solid particulate mixture into the dispensation mechanism. In some examples, as illustrated in FIGS. 9A-9C, at least one of the inner pressure ports 1011, the material ports 1008, and/or the outer pressure ports 1010 are substantially linear. In some examples, as illustrated in FIGS. 11A-11C, at least one of the inner pressure ports 1011, the material ports 1008, and/or the outer pressure ports 1010 can have a turbine geometry. Instead of the edge of the wear pad 106 and the feed wheel 104 being coincident along the entire edge, either the edge of the wear pad 106 or the edge of the feed wheel 104 can include at least one curved edge. The turbine-like design may provide additional benefits. For example, as the opening passes edge of the wear pad 106 it provides a sweeping effect that sheers sand off at a singular point rather than meeting a hard edge with previous pocket design which causes sand to enter between the two surfaces, reducing wear pad 106 and feed wheel 104 life.

In at least one example, the inner pressure port 1011 and the outer pressure port 1010 correspond to the same material port 1008. In some examples, the inner duct 900 and the outer duct 800 can be fluidly connected with opposing sides of the material port 1008. Accordingly, the inner pressure port 1011 and the outer pressure port 1010 can both receive pressurized gas to expel the material from the same material port 1008. In some examples, the inner pressure port 1011 and the corresponding outer pressure port 1010 can be operable to provide the pneumatic gas to the same material port 1008 at substantially the same time.

With both the inner pressure ports 1011 and the outer pressure ports 1010 providing pressure to the corresponding material port(s) 1008 from both sides (e.g., increased area), the feed wheel 104 can increase flow. Therefore, the feed wheel 104 can expel the material from the material port 1008 even more efficiently. The rotary feed wheel 104 can be covered by the wear pad 106 to maximize exposure of the particulate matter to the air pulse. Thus, the velocity and reliability of particulate matter ejection can be increased.

The combined force of the pneumatic fluids acting upon the single material port 1008 have proven to dramatically increase the flow due to the less restrictive design at the same amount of pressure as conventional feed wheels, which can increase speed, reliability, and volume of solid particulates injected into the operating dispensation stream.

The embodiments shown and described above are only examples. Even though numerous characteristics and advantages of the present technology have been set forth in the foregoing description, together with details of the structure and function of the present disclosure, the disclosure is illustrative only, and changes may be made in the detail, especially in matters of shape, size and arrangement of the parts within the principles of the present disclosure to the full extent indicated by the broad general meaning of the terms used in the attached claims. It will therefore be appreciated that the embodiments described above may be modified within the scope of the appended claims.

What is claimed is:

1. A feed wheel comprising:
   a body that is operable to rotate about a central axis, wherein the body includes a top surface and a bottom surface;
   a plurality of material ports formed in the body operable to receive material;
   a plurality of outer pressure ports formed in the body, the plurality of outer pressure ports being positioned radially outward in relation to the plurality of material ports,
   wherein each of the plurality of outer pressure ports is operable to receive pressurized gas when in registration with a pneumatic supply as the body rotates about the central axis,
   wherein each of the plurality of outer pressure ports are in fluid communication with a corresponding material port of the plurality of material ports such that when an outer pressure port of the plurality of outer pressure ports receives the pressurized gas, the pressurized gas discharges the material from the corresponding material port of the plurality of material ports out of the top surface of the body.

2. The feed wheel of claim 1, wherein the plurality of material ports and the plurality of outer pressure ports are formed in a substantially circular array around the central axis.

3. The feed wheel of claim 1, wherein the plurality of material ports is positioned between the plurality of outer pressure ports and the central axis.

4. The feed wheel of claim 1, wherein the plurality of material ports and the plurality of outer pressure ports are defined by the top surface of the body.

5. The feed wheel of claim 1, wherein each of the plurality of outer pressure ports are fluidly connected with the corresponding material port of the plurality of material ports via an outer duct.

6. The feed wheel of claim 5, wherein the outer duct is connected to the corresponding material port of the plurality of material ports proximate the bottom surface of the body.

7. The feed wheel of claim 1, further comprising a plurality of inner pressure ports formed in the body, the plurality of inner pressure ports being positioned radially inward in relation to the plurality of material ports,
wherein each of the plurality of inner pressure ports is operable to receive pressurized gas when in registration with the pneumatic supply as the body rotates about the central axis,
wherein each of the plurality of inner pressure ports are in fluid communication with a corresponding material port of the plurality of material ports such that when an inner pressure port of the plurality of inner pressure ports receives the pressurized gas, the pressurized gas discharges the material from the corresponding material port of the plurality of material ports out of the top surface of the body.

8. The feed wheel of claim 7, wherein the plurality of material ports, the plurality of outer pressure ports, and the plurality of inner pressure ports are formed in a substantially circular array around the central axis.

9. The feed wheel of claim 7, wherein the plurality of material ports is positioned between the plurality of inner pressure ports and the plurality of outer pressure ports.

10. The feed wheel of claim 7, wherein the plurality of inner pressure ports is positioned between the central axis and the plurality of material ports.

11. The feed wheel of claim 7, wherein the plurality of inner pressure ports is defined by the top surface of the body.

12. The feed wheel of claim 7, wherein each of the plurality of inner pressure ports are fluidly connected with the corresponding material port of the plurality of material ports via an inner duct.

13. The feed wheel of claim 12, wherein the inner duct is connected to the corresponding material port of the plurality of material ports proximate the bottom surface of the body.

14. The feed wheel of claim 7, wherein at least one of the inner pressure ports, the material ports, and/or the outer pressure ports are substantially linear.

15. The feed wheel of claim 7, wherein at least one of the inner pressure ports, the material ports, and/or the outer pressure ports have a turbine geometry.

16. The feed wheel of claim 7, wherein an inner pressure port of the plurality of pressure ports and a corresponding outer pressure port of the plurality of pressure ports correspond to a same material port of the plurality of material ports.

17. The feed wheel of claim 7, wherein the inner pressure port and the corresponding outer pressure port are operable to provide the pneumatic gas to the same material port at substantially the same time.

18. The feed wheel of claim 1, wherein at least one of the material ports and/or the outer pressure ports are substantially linear.

19. The feed wheel of claim 1, wherein at least one of the material ports and/or the outer pressure ports have a turbine geometry.

20. The feed wheel of claim 1, wherein the plurality of outer pressure ports is positioned proximate a perimeter of the body.

* * * * *